United States Patent
Murakami

(10) Patent No.: US 10,882,244 B2
(45) Date of Patent: Jan. 5, 2021

(54) RESIN FILM, BARRIER FILM, AND ELECTRICALLY CONDUCTIVE FILM, AND PRODUCTION METHODS THEREFOR

(71) Applicant: ZEON CORPORATION, Tokyo (JP)

(72) Inventor: Toshihide Murakami, Tokyo (JP)

(73) Assignee: ZEON CORPORATION, Tokyo (JP)

(*) Notice: Subject to any disclaimer, the term of this patent is extended or adjusted under 35 U.S.C. 154(b) by 170 days.

(21) Appl. No.: 16/334,075

(22) PCT Filed: Sep. 25, 2017

(86) PCT No.: PCT/JP2017/034448
§ 371 (c)(1),
(2) Date: Mar. 18, 2019

(87) PCT Pub. No.: WO2018/062067
PCT Pub. Date: Apr. 5, 2018

(65) Prior Publication Data
US 2019/0210268 A1  Jul. 11, 2019

(30) Foreign Application Priority Data
Sep. 29, 2016 (JP) ................... 2016-191798

(51) Int. Cl.
*B32B 27/00* (2006.01)
*B29C 55/08* (2006.01)
*C08G 61/08* (2006.01)
*C08J 5/18* (2006.01)

(52) U.S. Cl.
CPC ............. *B29C 55/08* (2013.01); *B32B 27/00* (2013.01); *C08G 61/08* (2013.01); *C08J 5/18* (2013.01)

(58) Field of Classification Search
CPC . B29C 55/08; C08G 61/08; C08J 5/18; B32B 27/00
See application file for complete search history.

(56) References Cited

U.S. PATENT DOCUMENTS

2017/0306113 A1  10/2017  Murakami et al.
2017/0355128 A1  12/2017  Obuchi et al.

FOREIGN PATENT DOCUMENTS

| EP | 3520996 A1 | 8/2019 |
| JP | 2002194067 A | 7/2002 |
| JP | 2013010309 A | 1/2013 |
| TW | 201615708 A | 5/2016 |
| WO | 2016067920 A1 | 5/2016 |

OTHER PUBLICATIONS

Apr. 23, 2020, the Extended European Search Report issued by the European Patent Office in the corresponding European Patent Application No. 17856020.7.
Apr. 2, 2019, International Preliminary Report on Patentability issued in the International Patent Application No. PCT/JP2017/034448.

*Primary Examiner* — Michael C Miggins
(74) *Attorney, Agent, or Firm* — Kenja IP Law PC

(57) ABSTRACT

A resin film formed of a resin containing a polymer containing an alicyclic structure and having crystallizability, wherein a crystallization degree of the polymer is 30% or more, and a thickness variation Tv of the resin film represented by the following formula (1) is 5% or less. The formula (1) is Tv [%]=[(Tmax−Tmin)/Tave]×100. In the formula (1), Tmax is a maximum value of the thickness of the resin film, Tmin is a minimum value of the thickness of the resin film, and Tave is an average value of the thickness of the resin film).

11 Claims, 4 Drawing Sheets

RESIN FILM, BARRIER FILM, AND ELECTRICALLY CONDUCTIVE FILM, AND PRODUCTION METHODS THEREFOR

FIELD

The present invention relates to a resin film; a barrier film having the resin film and an electroconductive film having the resin film; and a method for producing the resin film, a method for producing the barrier film, and a method for producing the electroconductive film.

BACKGROUND

As a technique regarding a resin film formed of a resin containing a polymer containing an alicyclic structure and having crystallizability, a technique is known in which the resin film is heated to promote crystallization of at least a part of the polymer (see Patent Literatures 1 and 2). The resin film formed of such a resin containing a crystallized polymer usually has excellent heat resistance. Further, the strength of the resin film is expected to be improved depending on the level of the crystallization degree.

CITATION LIST

Patent Literature

Patent Literature 1: Japanese Patent Application Laid-Open No. 2002-194067 A
Patent Literature 2: Japanese Patent Application Laid-Open No. 2013-010309 A

SUMMARY

Technical Problem

When the resin film is heated to promote crystallization of the polymer, the resulting resin film can reliably have a certain level of strength. However, it has been found that the bend resistance of the resulting resin film is sometimes poorer than expected. Herein, the bend resistance of the resin film refers to the resistance of the resin film to a large number of bending test.

In particular, when an electroconductive layer for an electroconductive film is provided on the resin film in order to use the resin film in an electroconductive film, a stress difference is caused between the resin film and the electroconductive layer. In order to reduce such a stress difference, the resin film is required to have excellent bend resistance. Similarly, when the resin film is used to produce a barrier film, the resin film is required to have excellent bend resistance.

In view of these circumstances, it is an object of the present invention to provide a resin film excellent in strength and bend resistance; a barrier film having the resin film and an electroconductive film having the resin film; and a method for producing the resin film, a method for producing the barrier film, and a method for producing the electroconductive film.

Solution to Problem

In order to achieve the aforementioned object, the present inventor has studied and found that the reason why the bend resistance of the resin film after crystallization promotion is poorer than expected is related to the thickness uniformity of the resin film. Further, it has been found that the thickness uniformity of the resin film is reduced during crystallization promotion; this finding has been discovered from the fact that even when the resin film has excellent thickness uniformity, its thickness uniformity is reduced after crystallization promotion.

Further, the present inventor has intensively studied and found that when the value of thickness variation calculated by a specific calculation formula is 5% or less, it is possible to provide a resin film having sufficiently excellent bend resistance. The present inventor has also found that in order to allow the resin film to have a value of thickness variation of 5% or less, it is effective to sufficiently pre-heat the resin film just before stretching treatment performed prior to crystallization promotion. Furthermore, the present inventor has also found that the use of the resin film having a value of thickness variation of 5% or less makes it possible to reduce a stress difference caused when an electroconductive layer or a barrier layer is provided on the resin film to thereby produce an electroconductive film or barrier film having less deformation. The present invention has been completed on the basis of the findings described above.

The present invention provides the following.

<1> A resin film formed of a resin containing a polymer containing an alicyclic structure and having crystallizability, wherein a crystallization degree of the polymer is 30% or more, and a thickness variation Tv of the resin film represented by the following formula (1) is 5% or less:

$$Tv\ [\%] = [(T\max - T\min)/Tave] \times 100 \quad (1),$$

(in the formula (1),

Tmax is a maximum value of the thickness of the resin film,

Tmin is a minimum value of the thickness of the resin film, and

Tave is an average value of the thickness of the resin film).

<2> The resin film according to <1>, wherein the polymer containing an alicyclic structure is a hydrogenated product of a ring-opening polymer of dicyclopentadiene.

<3> The resin film according to <1> or <2>, wherein an internal haze of the resin film is 3% or less.

<4> The resin film according to any one of <1> to <3>, wherein the resin film is an optical film.

<5> An electroconductive film comprising:

the resin film according to any one of <1> to <4>, and an electroconductive layer disposed on the resin film.

<6> A barrier film comprising:

the resin film according to any one of <1> to <4>, and a barrier layer disposed on the resin film.

<7> A method for producing the resin film according to any one of <1> to <4>, comprising:

a pre-heating step of pre-heating a first film formed of a resin containing a polymer containing an alicyclic structure and having crystallizability at a pre-heating temperature Tph falling within a range of a first temperature T1 or higher and a second temperature T2 or lower for a pre-heating time $t_{ph}$ in a state where at least two edges of the first film are held to obtain a second film;

a stretching step of subjecting the second film to a stretching treatment at a stretching temperature Tst falling within a range of the first temperature T1 or higher and the second temperature T2 or lower to obtain a third film; and a thermal setting step of maintaining the third film at a thermal setting temperature Tts that is higher than the stretching temperature Tst and falls within a range of a third temperature T3 or higher and lower than a melting point Tm of the polymer for 5 seconds or more in a state where at least two edges of the third film are held, wherein the first temperature T1 is represented by the following formula (2):

$$T1[°C.]=(5×Tg+5×Tpc)/10 \quad (2)$$

(in the formula (2), Tg is a glass transition temperature of the polymer and Tpc is a crystallization peak temperature of the polymer), the second temperature T2 is represented by the following formula (3):

$$T2[°C.]=(9×Tpc+1×Tm)/10 \quad (3),$$

an upper limit $t_{ph}$(max) of the pre-heating time $t_{ph}$ is represented by the following formula (4), $$t_{ph}(\text{max}) \text{ [sec]}=80×[(T1-Tph)/(T2-T1)]+90 \quad (4),$$ and the third temperature T3 is represented by the following formula (5):

$$T3[°C.]=(9×Tpc+1×Tm)/10 \quad (5).$$

<8> The method for producing the resin film according to <7>, wherein the thermal setting temperature Tts falls within a range of the third temperature T3 or higher and a fourth temperature T4 or lower, and the fourth temperature T4 is represented by the following formula (6):

$$T4[°C.]=(2×Tpc+8×Tm)/10 \quad (6).$$

<9> The method for producing the resin film according to <7> or <8>, wherein the thermal setting time $t_{ts}$ during which the thermal setting step is performed is equal to or less than 90 seconds.

<10> A method for producing an electroconductive film comprising a step of forming an electroconductive layer on the resin film according to any one of <1> to <4>.

<11> A method for producing a barrier film comprising a step of forming a barrier layer on the resin film according to any one of <1> to <4>.

Advantageous Effects of Invention

According to the present invention, a resin film excellent in strength and bend resistance; a barrier film having the resin film and an electroconductive film having the resin film; and a method for producing the resin film, a method for producing the barrier film, and a method for producing the electroconductive film can be provided.

DESCRIPTION OF EMBODIMENTS

Figure 1:
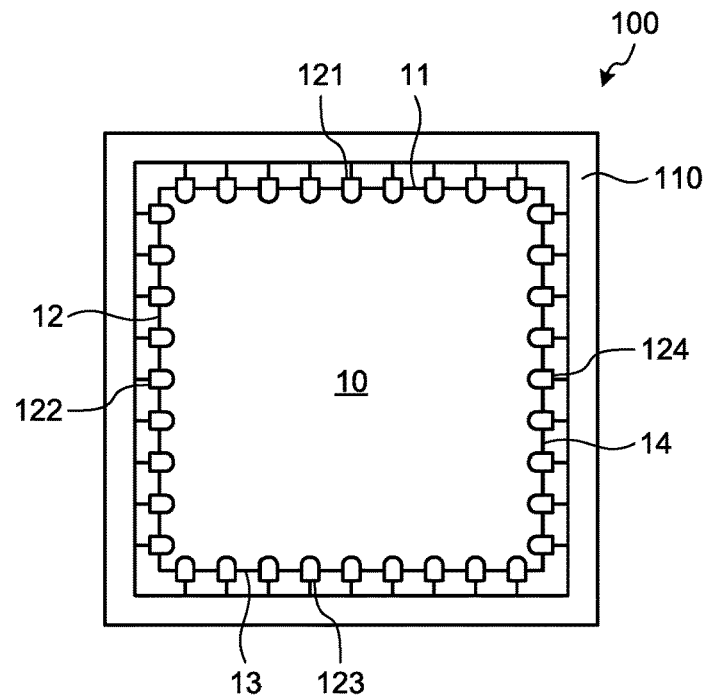
FIG. 1 is a plan view schematically illustrating an example of a holding device.

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the film is not particularly limited, but is usually 100,000 times or less.

In the following description, directions of elements being "parallel", "perpendicular", and "orthogonal" may allow an error within the range of not impairing the advantageous effects of the present invention, for example, within a range of ±5°, unless otherwise specified.

In the following description, the lengthwise direction of the long-length film is usually parallel to a film conveyance direction in the production line. Further, an MD direction (mashine direction) is a film conveyance direction in the production line, and is usually parallel to the lengthwise direction of the long-length film. Further, a TD direction (traverse direction) is a direction parallel to the film surface and perpendicular to the MD direction, and is usually parallel to the width direction of the long-length film.

[1. Resin Film]

The resin film according to the present invention is a resin film formed of a resin containing a polymer containing an alicyclic structure and having crystallizability. In the following description, the aforementioned resin may be referred to as "crystallizable resin" in some cases. The crystallization degree of the polymer contained in the crystallizable resin is 30% or more. Further, the resin film according to the present invention has a thickness variation Tv of 5% or less. The thickness variation Tv will be described later. Since the resin film according to the present invention has the above-described characteristics, the resin film is excellent in bend resistance.

[1.1. Crystallizable Resin]

The crystallizable resin includes a polymer containing an alicyclic structure and having crystallizability. Herein, the polymer containing an alicyclic structure refers to a polymer that has an alicyclic structure in the molecule and can be obtained by a polymerization reaction using a cyclic olefin as a monomer, or a hydrogenated product thereof. As the polymer containing an alicyclic structure, one type thereof may be solely used, and two or more types thereof may also be used in combination at any ratio.

Examples of the alicyclic structure contained in the polymer containing an alicyclic structure may include a cycloalkane structure, and a cycloalkene structure. Among these, a cycloalkane structure is preferable from the viewpoint of easily obtaining a resin film excellent in properties such as thermal stability. The number of carbon atoms contained per alicyclic structure is preferably 4 or more, and more preferably 5 or more, and is preferably 30 or less, more preferably 20 or less, and particularly preferably 15 or less. When the number of carbon atoms contained in one alicyclic structure falls within the aforementioned range, mechanical strength, heat resistance, and moldability are highly balanced.

In the polymer containing an alicyclic structure, the ratio of the structural unit having an alicyclic structure relative to all structural units is preferably 30% by weight or more, more preferably 50% by weight or more, and particularly preferably 70% by weight or more. When the ratio of the structural unit having an alicyclic structure in the polymer containing an alicyclic structure is increased as described above, heat resistance can be enhanced. The ratio of the structural unit having an alicyclic structure relative to all structural units may be 100% by weight or less.

The rest of the polymer containing an alicyclic structure other than the structural unit having an alicyclic structure is not particularly limited, and may be appropriately selected depending on the purposes of use.

The polymer containing an alicyclic structure contained in the crystallizable resin has crystallizability. The "polymer containing an alicyclic structure and having crystallizability" herein refers to a polymer containing an alicyclic structure and having a melting point Tm (specifically, a melting point thereof can be observed by a differential scanning calorimeter (DSC)). The melting point Tm of the polymer containing an alicyclic structure is preferably 200° C. or higher, and more preferably 230° C. or higher, and is preferably 290° C. or lower. By using the polymer containing an alicyclic structure and having such a melting point Tm, a resin film having moldability and heat resistance which are more excellently balanced can be obtained.

The weight-average molecular weight (Mw) of the polymer containing an alicyclic structure is preferably 1,000 or more, and more preferably 2,000 or more, and is preferably 1,000,000 or less, and more preferably 500,000 or less. The polymer containing an alicyclic structure and having such a weight-average molecular weight has excellent balance of molding processability and heat resistance.

The molecular weight distribution (Mw/Mn) of the polymer containing an alicyclic structure is preferably 1.0 or more, and more preferably 1.5 or more, and is preferably 4.0 or less, and more preferably 3.5 or less. Herein, Mn represents a number-average molecular weight. The polymer containing an alicyclic structure and having such a molecular weight distribution has excellent molding processability.

The weight-average molecular weight (Mw) and the molecular weight distribution (Mw/Mn) of the polymer containing an alicyclic structure may be measured as a polystyrene-equivalent value by gel permeation chromatography (GPC) using tetrahydrofuran as a developing solvent.

The glass transition temperature Tg of the polymer containing an alicyclic structure is not particularly limited, but is usually 85° C. or higher and is usually 170° C. or lower.

Examples of the polymer containing an alicyclic structure may include the following polymer ($\alpha$) to polymer ($\delta$). Among these, the polymer ($\beta$) is preferable as the polymer containing an alicyclic structure and having crystallizability because therewith a resin film having excellent heat resistance can be easily obtained.

Polymer ($\alpha$): a ring-opening polymer of a cyclic olefin monomer having crystallizability Polymer ($\beta$): a hydrogenated product of the polymer ($\alpha$) having crystallizability Polymer ($\gamma$): an addition polymer of a cyclic olefin monomer having crystallizability Polymer ($\delta$): a hydrogenated product and the like of the polymer ($\gamma$) having crystallizability Specifically, the polymer containing an alicyclic structure is more preferably a ring-opening polymer of dicyclopentadiene having crystallizability or a hydrogenated product of the ring-opening polymer of dicyclopentadiene having crystallizability. The polymer containing an alicyclic structure is particularly preferably a hydrogenated product of the ring-opening polymer of dicyclopentadiene having crystallizability. Herein, the ring-opening polymer of dicyclopentadiene refers to a polymer in which the ratio of a structural unit derived from dicyclopentadiene relative to all structural units is usually 50% by weight or more, preferably 70% by weight or more, more preferably 90% by weight or more, and further preferably 100% by weight.

Hereinafter, methods for producing the polymer ($\alpha$) and the polymer ($\beta$) will be described.

The cyclic olefin monomer available for producing the polymer ($\alpha$) and the polymer ($\beta$) is a compound which has a ring structure formed of carbon atoms and includes a carbon-carbon double bond in the ring. Examples of the cyclic olefin monomer may include a norbornene-based monomer. When the polymer ($\alpha$) is a copolymer, a monocyclic olefin may be used as the cyclic olefin monomer.

The norbornene-based monomer is a monomer containing a norbornene ring. Examples of the norbornene-based monomer may include a bicyclic monomer such as bicyclo[2.2.1]hept-2-ene (common name: norbornene) and 5-ethylidene-bicyclo[2.2.1]hept-2-ene (common name: ethylidene norbornene) and derivatives thereof (for example, those with a substituent on the ring); a tricyclic monomer such as tricyclo[4.3.0.1$^{2,5}$]deca-3,7-diene (common name: dicyclopentadiene) and derivatives thereof; and a tetracyclic monomer such as 7,8-benzotricyclo[4.3.0.1$^{2,5}$]dec-3-ene (common name: methanotetrahydrofluorene: also referred to as 1,4-methano-1,4,4a,9a-tetrahydrofluorene) and derivatives thereof, tetracyclo[4.4.0.1$^{2,5}$.1$^{2,5}$.1$^{7,10}$]dodec-3-ene (common name: tetracyclododecene), and 8-ethylidenetetracyclo[4.4.0.1$^{2,5}$1$^{7,10}$]-3-dodecene and derivatives thereof.

Examples of the substituent in the aforementioned monomer may include: an alkyl group such as a methyl group and an ethyl group; an alkenyl group such as a vinyl group; an alkylidene group such as propane-2-ylidene; an aryl group such as a phenyl group; a hydroxy group; an acid anhydride group; a carboxyl group; and an alkoxycarbonyl group such as a methoxycarbonyl group. As the aforementioned substituent, one type thereof may be solely used, and two or more types thereof may also be used in combination at any ratio.

Examples of the monocyclic olefin may include cyclic monoolefins such as cyclobutene, cyclopentene, methylcyclopentene, cyclohexene, methylcyclohexene, cycloheptene, and cyclooctene; and cyclic diolefins such as cyclohexadiene, methylcyclohexadiene, cyclooctadiene, methylcyclooctadiene, and phenylcyclooctadiene.

As the cyclic olefin monomer, one type thereof may be solely used, and two or more types thereof may also be used in combination at any ratio. When two or more types of the cyclic olefin monomers are used, the polymer ($\alpha$) may be a block copolymer or a random copolymer.

Some of the cyclic olefin monomers may allow presence of endo- and exo-stereoisomers. As the cyclic olefin monomer, any of the endo- and exo-isomers may be used. One of the endo- and exo-isomers may be solely used, and an isomer mixture containing the endo- and exo-isomers at any ratio may also be used. In particular, it is preferable that the ratio of one of the endo- and exo-isomers is at a high level because crystallizability of the polymer containing an alicyclic structure is thereby enhanced and a resin film having excellent heat resistance can thereby be easily obtained. For example, the ratio of the endo- or exo-isomer is preferably 80% or more, more preferably 90% or more, and further preferably 95% or more. It is preferable that the ratio of the endo-isomer is high because it can be easily synthesized.

Usually, the polymer (α) and the polymer (β) may have increased crystallizability by increasing the degree of syndiotactic stereoregularity thereof (the ratio of the racemo diad). From the viewpoint of increasing the degree of stereoregularity of the polymer (α) and the polymer (β), the ratio of the racemo diad in the structural units of the polymer (α) and the polymer (β) is preferably 51% or more, more preferably 60% or more, and particularly preferably 70% or more. The upper limit of the ratio of the racemo diad may be 100% or less.

The ratio of the racemo diad may be measured by $^{13}$C-NMR spectrum analysis. Specifically, the measurement may be performed by the following method.

The $^{13}$C-NMR measurement of a polymer sample is performed at 200° C. with ortho-dichlorobenzene-d$^4$ as a solvent by an inverse-gated decoupling method. From the result of this $^{13}$C-NMR measurement, a signal at 43.35 ppm derived from the meso diad and a signal at 43.43 ppm derived from the racemo diad are identified with the peak at 127.5 ppm of ortho-dichlorobenzene-d$^4$ as a reference shift. On the basis of the intensity ratio of these signals, the ratio of the racemo diad of the polymer sample may be determined.

For the synthesis of the polymer (α), a ring-opening polymerization catalyst is usually used. As the ring-opening polymerization catalyst, one type thereof may be solely used, and two or more types thereof may also be used in combination at any ratio. As such a ring-opening polymerization catalyst for synthesis of the polymer (α), a ring-opening polymerization catalyst that can cause ring-opening polymerization of the cyclic olefin monomer to produce a ring-opening polymer having syndiotactic stereoregularity is preferable. Preferable examples of the ring-opening polymerization catalyst may include those containing a metal compound represented by the following formula (7):

$$M(NR^1)X_{4-a}(OR^2)_a \cdot L_b \quad (7)$$

(In the formula (7),

M is a metal atom selected from the group consisting of the Group 6 transition metal atoms in the periodic table, R$^1$ is a phenyl group optionally having a substituent at at least one of 3-, 4-, and 5-positions, or a group represented by —CH$_2$R$^3$ (wherein R$^3$ is a group selected from the group consisting of a hydrogen atom, an alkyl group optionally having a substituent, and an aryl group optionally having a substituent), R$^2$ is a group selected from the group consisting of an alkyl group optionally having a substituent and an aryl group optionally having a substituent, X is a group selected from the group consisting of a halogen atom, an alkyl group optionally having a substituent, an aryl group optionally having a substituent, and an alkylsilyl group, L is a neutral electron donor ligand, a is a number of 0 or 1, and b is an integer of 0 to 2.)

In the formula (7), M is a metal atom selected from the group consisting of the Group 6 transition metal atoms in the periodic table. M is preferably chromium, molybdenum, or tungsten, more preferably molybdenum or tungsten, and particularly preferably tungsten.

In the formula (7), R$^1$ is a phenyl group optionally having a substituent at at least one of the 3-, 4-, and 5-positions, or a group represented by —CH$_2$R$^3$.

The number of carbon atoms of the phenyl group optionally having a substituent at at least one of the 3-, 4-, and 5-positions of R$^1$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As these substituents, one type thereof may be solely used, and two or more types thereof may also be used in combination at any ratio. In R$^1$, the substituents present at at least two of the 3-, 4-, and 5-positions may be bonded to each other, to form a ring structure.

Examples of the phenyl group optionally having a substituent at at least one of the 3-, 4-, and 5-positions may include an unsubstituted phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group, and a 3,4,5-trichlorophenyl group; and a 2-naphthyl group optionally having a substituent such as a 2-naphthyl group, a 3-methyl-2-naphthyl group, and a 4-methyl-2-naphthyl group.

In the group represented by —CH$_2$R$^3$ of R$^1$, R$^3$ is a group selected from the group consisting of a hydrogen atom, an alkyl group optionally having a substituent, and an aryl group optionally having a substituent.

The number of carbon atoms in the alkyl group optionally having a substituent of R$^3$ is preferably 1 to 20, and more preferably 1 to 10. This alkyl group may be either linear or branched. Examples of the substituent may include a phenyl group optionally having a substituent such as a phenyl group and a 4-methylphenyl group; and an alkoxyl group such as a methoxy group and an ethoxy group. As the substituent, one type thereof may be solely used, and two or more types thereof may also be used in combination at any ratio.

Examples of the alkyl group optionally having a substituent of R$^3$ may include a methyl group, an ethyl group, a propyl group, an isopropyl group, a butyl group, an isobutyl group, a t-butyl group, a pentyl group, a neopentyl group, a benzyl group, and a neophyl group.

The number of carbon atoms in the aryl group optionally having a substituent of R$^3$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio.

Examples of the aryl group optionally having a substituent of R$^3$ may include a phenyl group, a 1-naphthyl group, a 2-naphthyl group, a 4-methylphenyl group, and a 2,6-dimethylphenyl group.

Among these, the group represented by R$^3$ is preferably an alkyl group of 1 to 20 carbon atoms.

In the formula (7), R$^2$ is a group selected from the group consisting of an alkyl group optionally having a substituent and an aryl group optionally having a substituent. As the alkyl group optionally having a substituent and the aryl group optionally having a substituent of $R^2$, a group selected from groups enumerated as the alkyl groups optionally having a substituent and the aryl groups optionally having a substituent, respectively, of $R^3$ may be optionally used.

In the formula (7), X is a group selected from the group consisting of a halogen atom, an alkyl group optionally having a substituent, an aryl group optionally having a substituent, and an alkylsilyl group.

Examples of the halogen atom of X may include a chlorine atom, a bromine atom, and an iodine atom.

As the alkyl group optionally having a substituent and the aryl group optionally having a substituent of X, a group selected from groups enumerated as the alkyl groups optionally having a substituent and the aryl groups optionally having a substituent, respectively, of $R^3$ may be optionally used.

Examples of the alkylsilyl group of X may include a trimethylsilyl group, a triethylsilyl group, and a t-butyldimethylsilyl group.

When the metal compound represented by the formula (7) has two or more X's in one molecule, the X's may be the same as or different from each other. Further, the two or more X's may be bonded to each other to form a ring structure.

In the formula (7), L is a neutral electron donor ligand.

Examples of the neutral electron donor ligand of L may include an electron donor compound containing an atom of the Group 14 or 15 in the periodic table. Specific examples thereof may include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; and amines such as trimethylamine, triethylamine, pyridine, and lutidine. Among these, ethers are preferable. When the metal compound represented by the formula (7) has two or more L's in one molecule, the L's may be the same as or different from each other.

The metal compound represented by the formula (7) is preferably a tungsten compound having a phenylimido group. That is, a metal compound represented by the formula (7) wherein M is a tungsten atom and $R^1$ is a phenyl group is preferable. In particular, a tetrachlorotungsten phenylimide (tetrahydrofuran) complex is more preferable.

The method for producing the metal compound represented by the formula (7) is not particularly limited. For example, as described in Japanese Patent Application Laid-Open No. Hei. 5-345817 A, the metal compound represented by the formula (7) may be produced by mixing an oxyhalogenated product of a Group 6 transition metal; a phenyl isocyanate optionally having a substituent at at least one of the 3-, 4-, and 5-positions or a monosubstituted methyl isocyanate; a neutral electron donor ligand (L); and if necessary, an alcohol, a metal alkoxide, and a metal aryloxide.

In the aforementioned production method, the metal compound represented by the formula (7) is usually obtained in a state where the compound is contained in a reaction liquid. After production of the metal compound, the aforementioned reaction liquid as it is may be used as a catalyst liquid for the ring-opening polymerization reaction. Alternatively, the metal compound may be isolated from the reaction liquid and purified by a purification treatment such as crystallization, and the resulting metal compound may be used for the ring-opening polymerization reaction.

As the ring-opening polymerization catalyst, the metal compound represented by the formula (7) may be solely used. Alternatively, the metal compound represented by the formula (7) may be used in combination with another component. For example, the metal compound represented by the formula (7) may be used in combination with an organometallic reductant, to improve polymerization activity.

Examples of the organometallic reductant may include organometallic compounds of Groups 1, 2, 12, 13, and 14 in the periodic table, having a hydrocarbon group of 1 to 20 carbon atoms. Examples of such organometallic compounds may include an organolithium such as methyllithium, n-butyllithium, and phenyllithium; an organomagnesium such as butylethylmagnesium, butyloctylmagnesium, dihexylmagnesium, ethylmagnesium chloride, n-butylmagnesium chloride, and allylmagnesium bromide; an organozinc such as dimethylzinc, diethylzinc, and diphenylzinc; an organoaluminum such as trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, and isobutylaluminum diisobutoxide; and an organotin such as tetramethyltin, tetra(n-butyl)tin, and tetraphenyltin. Among these, an organoaluminum and an organotin are preferable. As the organometallic reductant, one type thereof may be solely used, and two or more types thereof may also be used in combination at any ratio.

The ring-opening polymerization reaction is usually performed in an organic solvent. As the organic solvent, an organic solvent that allows the ring-opening polymer and a hydrogenated product thereof to be dissolved or dispersed under specific conditions and does not inhibit the ring-opening polymerization reaction and a hydrogenation reaction may be used. Examples of such an organic solvent may include aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, and xylene; halogenated aliphatic hydrocarbons such as dichloromethane, chloroform, and 1,2-dichloroethane; halogenated aromatic hydrocarbons such as chlorobenzene and dichlorobenzene; nitrogen-containing hydrocarbons such as nitromethane, nitrobenzene, and acetonitrile; ethers such as diethyl ether and tetrahydrofuran; and mixed solvents obtained by a combination thereof. Among these, aromatic hydrocarbons, aliphatic hydrocarbons, alicyclic hydrocarbons, and ethers are preferable as the organic solvent. As the organic solvent, one type thereof may be solely used, and two or more types thereof may also be used in combination at any ratio.

The ring-opening polymerization reaction may be initiated, for example, by mixing the cyclic olefin monomer, the metal compound represented by the formula (7), and if necessary, the organometallic reductant. The order of mixing these components is not particularly limited. For example, a solution containing the metal compound represented by the formula (7) and the organometallic reductant may be mixed in a solution containing the cyclic olefin monomer. Alternatively, a solution containing the cyclic olefin monomer and the metal compound represented by the formula (7) may be mixed in a solution containing the organometallic reductant. Further, a solution containing the metal compound represented by the formula (7) may be mixed in a solution containing the cyclic olefin monomer and the organometallic reductant. When the respective components are mixed, the total amount of each of the components may be mixed at once. Alternatively, the components may be mixed in a plurality of divided batches. The components may also be continuously mixed over a relatively long period of time (for example, 1 minute or more).

The concentration of the cyclic olefin monomer in the reaction liquid at the time of starting the ring-opening polymerization reaction is preferably 1% by weight or more, more preferably 2% by weight or more, and particularly preferably 3% by weight or more, and is preferably 50% by weight or less, more preferably 45% by weight or less, and particularly preferably 40% by weight or less. When the concentration of the cyclic olefin monomer is equal to or more than the lower limit value of the aforementioned range, productivity can be enhanced. When the concentration thereof is equal to or less than the upper limit value, viscosity of the reaction liquid after the ring-opening polymerization reaction can be decreased. Consequently, the subsequent hydrogenation reaction can be facilitated.

The amount of the metal compound represented by the formula (7) used in the ring-opening polymerization reaction is desirably set so that the molar ratio of "metal compound: cyclic olefin monomer" falls within a specific range. Specifically, the aforementioned molar ratio is preferably 1:100 to 1:2,000,000, more preferably 1:500 to 1,000,000, and particularly preferably 1:1,000 to 1:500,000. When the amount of the metal compound is equal to or more than the lower limit value of the aforementioned range, sufficient polymerization activity can be obtained. When the amount thereof is equal to or less than the upper limit value, the metal compound can be easily removed after the reaction.

The amount of the organometallic reductant is preferably 0.1 mol or more, more preferably 0.2 mol or more, and particularly preferably 0.5 mol or more, and is preferably 100 mol or less, more preferably 50 mol or less, and particularly preferably 20 mol or less, relative to 1 mol of the metal compound represented by the formula (7). When the amount of the organometallic reductant is equal to or more than the lower limit value of the aforementioned range, polymerization activity can be sufficiently enhanced. When the amount is equal to or less than the upper limit value, occurrence of a side reaction can be suppressed.

The polymerization reaction system of the polymer ($\alpha$) may contain an activity adjuster. When the activity adjuster is used, the ring-opening polymerization catalyst can be stabilized, the reaction speed of the ring-opening polymerization reaction can be adjusted, and the molecular weight distribution of the polymer can be adjusted.

As the activity adjuster, an organic compound having a functional group may be used. Examples of the activity adjuster may include an oxygen-containing compound, a nitrogen-containing compound, and a phosphorus-containing organic compound.

Examples of the oxygen-containing compound may include: ethers such as diethyl ether, diisopropyl ether, dibutyl ether, anisole, furan, and tetrahydrofuran; ketones such as acetone, benzophenone, and cyclohexanone; and esters such as ethyl acetate.

Examples of the nitrogen-containing compound may include: nitriles such as acetonitrile and benzonitrile; amines such as triethylamine, triisopropylamine, quinuclidine, and N,N-diethylaniline; and pyridines such as pyridine, 2,4-lutidine, 2,6-lutidine, and 2-t-butylpyridine.

Examples of the phosphorous-containing compound may include: phosphines such as triphenyl phosphine, tricyclohexyl phosphine, triphenyl phosphate, and trimethyl phosphate; and phosphine oxides such as triphenyl phosphine oxide.

As the activity adjuster, one type thereof may be solely used, and two or more types thereof may also be used in combination at any ratio.

The amount of the activity adjuster in the polymerization reaction system of the polymer ($\alpha$) is preferably 0.01 mol % to 100 mol % relative to 100 mol % of the metal compound represented by the formula (7).

In order to adjust the molecular weight of the polymer ($\alpha$), the polymerization reaction system of the polymer ($\alpha$) may contain a molecular weight adjuster. Examples of the molecular weight adjuster may include: $\alpha$-olefins such as 1-butene, 1-pentene, 1-hexene, and 1-octene; aromatic vinyl compounds such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as allyl chloride; a nitrogen-containing vinyl compound such as acrylamide; non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated dienes such as 1,3-butadiene, 2-methyl-1,3-butadiene, 2,3-dimethyl-1,3-butadiene, 1,3-pentadiene, and 1,3-hexadiene.

As the molecular weight adjuster, one type thereof may be solely used, and two or more types thereof may also be used in combination at any ratio.

The amount of the molecular weight adjuster in the polymerization reaction system for polymerizing the polymer ($\alpha$) may be appropriately determined depending on an intended molecular weight. The specific amount of the molecular weight adjuster is preferably in a range of 0.1 mol % to 50 mol % relative to the cyclic olefin monomer.

The polymerization temperature is preferably $-78°$ C. or higher, and more preferably $-30°$ C. or higher, and is preferably $+200°$ C. or lower, and more preferably $+180°$ C. or lower.

The polymerization time may be dependent on reaction scale. The specific polymerization time is preferably in a range of 1 minute to 1,000 hours.

By the aforementioned production method, the polymer ($\alpha$) may be obtained. By hydrogenating this polymer ($\alpha$), the polymer ($\beta$) may be produced.

For example, the polymer ($\alpha$) may be hydrogenated by supplying hydrogen into the reaction system containing the polymer ($\alpha$) in the presence of a hydrogenation catalyst in accordance with an ordinary method. When reaction conditions in this hydrogenation reaction are appropriately set, usually the tacticity of the hydrogenated product is not altered by the hydrogenation reaction.

As the hydrogenation catalyst, a homogeneous catalyst or a heterogeneous catalyst that is publicly known as a hydrogenation catalyst for an olefin compound may be used.

Examples of the homogeneous catalyst may include a catalyst formed of a combination of a transition metal compound and an alkali metal compound such as cobalt acetate/triethylaluminum, nickel acetylacetonate/triisobutylaluminum, titanocene dichloride/n-butyllithium, zirconocene dichloride/sec-butyllithium, and tetrabutoxy titanate/dimethylmagnesium; and a noble metal complex catalyst such as dichlorobis(triphenylphosphine)palladium, chlorohydridecarbonyltris(triphenylphosphine)ruthenium, chlorohydridecarbonylbis(tricyclohexylphosphine)ruthenium, bis(tricyclohexylphosphine)benzylidyne ruthenium (IV) dichloride, and chlorotris(triphenylphosphine)rhodium.

Examples of the heterogeneous catalyst may include a metal catalyst such as nickel, palladium, platinum, rhodium, and ruthenium; and a solid catalyst in which the aforementioned metal is supported on a carrier such as carbon, silica, diatomaceous earth, alumina, or titanium oxide such as nickel/silica, nickel/diatomaceous earth, nickel/alumina, palladium/carbon, palladium/silica, palladium/diatomaceous earth, and palladium/alumina.

As the hydrogenation catalyst, one type thereof may be solely used, and two or more types thereof may also be used in combination at any ratio.

The hydrogenation reaction is usually performed in an inert organic solvent. Examples of the inert organic solvent may include: aromatic hydrocarbons such as benzene and toluene; aliphatic hydrocarbons such as pentane and hexane; alicyclic hydrocarbons such as cyclohexane and decahydronaphthalene; and ethers such as tetrahydrofuran and ethylene glycol dimethyl ether. As the inert organic solvent, one type thereof may be solely used, and two or more types thereof may also be used in combination at any ratio. The inert organic solvent may be the same as or different from the organic solvent used in the ring-opening polymerization reaction. Furthermore, the hydrogenation reaction may be performed by adding the hydrogenation catalyst to the reaction liquid of the ring-opening polymerization reaction.

Usually, the reaction conditions for the hydrogenation reaction may also vary depending on the hydrogenation catalyst used.

The reaction temperature of the hydrogenation reaction is preferably −20° C. or higher, more preferably −10° C. or higher, and particularly preferably 0° C. or higher, and is preferably +250° C. or lower, more preferably +220° C. or lower, and particularly preferably +200° C. or lower. When the reaction temperature is equal to or higher than the lower limit value of the aforementioned range, reaction speed can be increased. When the reaction temperature is equal to or lower than the upper limit value, occurrence of a side reaction can be suppressed.

The hydrogen pressure is preferably 0.01 MPa or more, more preferably 0.05 MPa or more, and particularly preferably 0.1 MPa or more, and is preferably 20 MPa or less, more preferably 15 MPa or less, and particularly preferably 10 MPa or less. When the hydrogen pressure is equal to or more than the lower limit value of the aforementioned range, reaction speed can be increased. When the hydrogen pressure is equal to or less than the upper limit value, a special apparatus such as a high pressure resistant reaction apparatus is not required, and thereby facility costs can be reduced.

The reaction time of the hydrogenation reaction may be set to any time period during which a desired hydrogenation rate is achieved, and preferably 0.1 hour to 10 hours.

After the hydrogenation reaction, the polymer (β), which is the hydrogenated product of the polymer (α), is usually collected in accordance with an ordinary method.

The hydrogenation rate (the ratio of the hydrogenated main-chain double bond) in the hydrogenation reaction is preferably 98% or more, and more preferably 99% or more. As the hydrogenation rate becomes higher, heat resistance of the polymer containing an alicyclic structure can be made more favorable. The upper limit of the hydrogenation rate may be 100% or less.

Herein, the hydrogenation rate of the polymer may be measured by a $^1$H-NMR measurement at 145° C. with o-dichlorobenzene-$d^4$ as a solvent.

Subsequently, the methods for producing the polymer (γ) and the polymer (δ) will be described.

The cyclic olefin monomer to be used for producing the polymer (γ) and the polymer (δ) may be optionally selected from the range enumerated as the cyclic olefin monomers to be used for producing the polymer (α) and the polymer (β). As the cyclic olefin monomer, one type thereof may be solely used, and two or more types thereof may also be used in combination at any ratio.

In the production of the polymer (γ), an optional monomer which is copolymerizable with a cyclic olefin monomer may be used as a monomer in combination with the cyclic olefin monomer. Examples of the optional monomer may include: α-olefins of 2 to 20 carbon atoms such as ethylene, propylene, 1-butene, 1-pentene, and 1-hexene; an aromatic ring vinyl compound such as styrene and α-methylstyrene; and non-conjugated dienes such as 1,4-hexadiene, 4-methyl-1,4-hexadiene, 5-methyl-1,4-hexadiene, and 1,7-octadiene. Among these, an α-olefin is preferable, and ethylene is more preferable. As the optional monomer, one type thereof may be solely used, and two or more types thereof may also be used in combination at any ratio.

The ratio between the cyclic olefin monomer and the optional monomer in terms of a weight ratio (cyclic olefin monomer:optional monomer) is preferably 30:70 to 99:1, more preferably 50:50 to 97:3, and particularly preferably 70:30 to 95:5.

When two or more types of the cyclic olefin monomers are used, or when the cyclic olefin monomer and the optional monomer are used in combination, the polymer (γ) may be a block copolymer, or a random copolymer.

For the synthesis of the polymer (γ), an addition polymerization catalyst is usually used. Examples of the addition polymerization catalyst may include a vanadium-based catalyst formed from a vanadium compound and an organoaluminum compound, a titanium-based catalyst formed from a titanium compound and an organoaluminum compound, and a zirconium-based catalyst formed from a zirconium complex and aluminoxane. As the addition polymerization catalyst, one type thereof may be solely used, and two or more types thereof may also be used in combination at any ratio.

The amount of the addition polymerization catalyst is preferably 0.000001 mol or more, and more preferably 0.00001 mol or more, and is preferably 0.1 mol or less, and more preferably 0.01 mol or less, relative to 1 mol of a monomer.

The addition polymerization of the cyclic olefin monomer is usually performed in an organic solvent. The organic solvent may be optionally selected from the range enumerated as the organic solvents to be used for the ring-opening polymerization of a cyclic olefin monomer. As the organic solvent, one type thereof may be solely used, and two or more types thereof may also be used in combination at any ratio.

The polymerization temperature in the polymerization for producing the polymer (γ) is preferably −50° C. or higher, more preferably −30° C. or higher, and particularly preferably −20° C. or higher, and is preferably 250° C. or lower, more preferably 200° C. or lower, and particularly preferably 150° C. or lower. The polymerization time is preferably 30 minutes or more, and more preferably 1 hour or more, and is preferably 20 hours or less, and more preferably 10 hours or less.

By the aforementioned production method, the polymer (γ) may be obtained. By hydrogenating this polymer (γ), the polymer (δ) may be produced.

The hydrogenation of the polymer (γ) may be performed by the same method as the method previously described as the method for hydrogenating the polymer (α).

In the crystallizable resin, the ratio of the polymer containing an alicyclic structure and having crystallizability is preferably 50% by weight or more, more preferably 70% by weight or more, and particularly preferably 90% by weight or more. When the ratio of the polymer containing an alicyclic structure and having crystallizability is equal to or more than the lower limit value of the aforementioned range, heat resistance of the resin film according to the present invention can be enhanced. The upper limit of the ratio of the polymer containing an alicyclic structure and having crystallizability may be 100% by weight or less.

The polymer containing an alicyclic structure contained in the crystallizable resin may not be crystallized prior to production of the resin film according to the present invention. However, after production of the resin film according to the present invention, the polymer containing an alicyclic structure contained in the crystallizable resin for forming the resin film is usually crystallized and may thereby have a high crystallization degree. The specific range of the crystallization degree may be appropriately selected depending on the desired performances, and preferably 10% or more, and more preferably 15% or more. When the crystallization degree of the polymer containing an alicyclic structure contained in the resin film is equal to or more than the lower limit value of the aforementioned range, high heat resistance and chemical resistance can be imparted to the resin film.

The crystallization degree of the polymer containing an alicyclic structure contained in the resin film may be measured by an X-ray diffraction method.

The crystallizable resin may contain an optional component in addition to the polymer containing an alicyclic structure and having crystallizability. Examples of the optional components may include an antioxidant such as a phenol-based antioxidant, a phosphorus-based antioxidant, and a sulfur-based antioxidant; a light stabilizer such as a hindered amine-based light stabilizer; a wax such as a petroleum-based wax, a Fischer-Tropsch wax, and a polyalkylene wax; a nucleating agent such as a sorbitol-based compound, a metal salt of an organic phosphoric acid, a metal salt of an organic carboxylic acid, kaolin, and talc; a fluorescent brightener such as a diaminostilbene derivative, a coumarin derivative, an azole-based derivative (for example, a benzoxazole derivative, a benzotriazole derivative, a benzimidazole derivative, and a benzothiazole derivative), a carbazole derivative, a pyridine derivative, a naphthalic acid derivative, and an imidazolone derivative; an ultraviolet absorber such as a benzophenone-based ultraviolet absorber, a salicylic acid-based ultraviolet absorber, and a benzotriazole-based ultraviolet absorber; an inorganic filler such as talc, silica, calcium carbonate, and glass fiber; a colorant; a flame retardant; a flame retardant auxiliary; an antistatic agent; a plasticizer; a near-infrared absorber; a lubricant; a filler, and an optional polymer other than the polymer containing an alicyclic structure and having crystallizability, such as a soft polymer. As the optional component, one type thereof may be solely used, and two or more types thereof may also be used in combination at any ratio.

[1.2. Properties of Resin Film]

(Bend Resistance of Resin Film)

The resin film according to the present invention is formed of the crystallizable resin described above. A prior-art resin film formed of a crystallizable resin generally tends to have bend resistance that is not sufficiently excellent. However, the resin film according to the present invention has sufficiently excellent bend resistance in spite of the fact that the resin film is formed of a resin containing a polymer containing an alicyclic structure and having a crystallization degree of 30% or more. Herein, the bend resistance may be evaluated on the basis of the number of bending cycles to fracture measured by a method such as the one that will be described later as one of evaluation items in the section of Examples. Specifically, the bend resistance of the resin film can be evaluated as sufficiently excellent when the number of bending cycles to fracture is 100×1000 cycles or more, and can be evaluated as particularly excellent when the number of bending cycles to fracture is 200×1000 cycles or more. As described above, the resin film according to the present invention has sufficiently excellent bend resistance, and is therefore suitable for use as an optical film and for use in an electroconductive film or a barrier film.

(Crystallization Degree of Resin Film)

The crystallization degree of the polymer contained in the resin film according to the present invention is 30% or more, and preferably 35% or more. The upper limit of the crystallization degree is not particularly limited, and therefore may be 100% or less, but is preferably 85% or less. When the crystallization degree of the polymer is equal to or more than the lower limit described above, high strength can be achieved. When the crystallization degree of the polymer is equal to or lower than the upper limit described above, excellent bend resistance can be more easily achieved.

(Thickness Variation Tv of Resin Film)

As describe above, the thickness variation Tv of the resin film according to the present invention whose bend resistance is evaluated as sufficiently excellent is 5% or less, preferably 4 or less, and more preferably 3 or less. The thickness variation Tv is ideally 0%, but the lower limit of the thickness variation Tv may be more than 0%.

Herein, the thickness variation Tv is determined by substituting the maximum value Tmax of thickness of the resin film, the minimum value Tmin of thickness of the resin film, and the average value Tave of thickness of the resin film into the following formula (8).

$$Tv\ [\%]=[(Tmax-Tmin)/Tave]\times 100 \qquad (8)$$

The maximum value Tmax, the minimum value Tmin, and the average value Tave are measured in the following manner. By measuring the thickness in the following manner, it is possible to evaluate the thickness variation Tv and the thickness that are not local indicators of the resin film but overall indicators of the resin film.

First, a measurement subject region for the resin film thickness is defined on the surface of the resin film. Specifically, when the resin film is a film in a sheet piece shape with four edges (long edges and short edges) all of which have a length of 1 µm or less, the entire surface of the film is defined as a measurement subject region. When the resin film is a film in a sheet piece shape or a long-length film with four edges (long edges and short edges) any or all of which have a length of more than 1 m, a randomly selected area having a size of short edge length x short edge length on the film surface is defined as a measurement subject region.

Then, in the measurement subject region thus defined, at least 30 points are defined as measurement points for the resin film thickness. These measurement points are defined such that the area of a polygon formed by connecting with straight lines the measurement points located on the outer edge-side of the measurement subject region on the film surface is 70% or more of the area of the measurement subject region. However, the measurement points located on the outer edge-side satisfy the condition that an inner angle between a line connecting the two adjacent measurement points and a line connecting one of the end points of the above-described line and the measurement point located next to the end point is 1800 or less. The number and positions of the measurement points in the polygonal region other than the measurement points located on the outer edge-side of the measurement subject region may be optionally defined as long as the measurement points located on the outer edge-side of the measurement subject region are defined. However, the measurement points are defined such that all of the triangles formed by connecting randomly selected three of the measurement points satisfy the requirements that the area of each specific triangle is 50 cm² or less, and that the area is 5% or less of the area of the measurement subject region. In this regard, all of the triangles are those which does not contain other measurement points in its inner region including points on its edges. For example, when the resin film is a film in a sheet piece shape with four edges all of which have a length of 1 µm or less, the measurement points may be defined by a method such as the one that will be described later as one of evaluation items in the section of Examples.

Then, the thickness of the resin film is measured at measurement points defined in such a manner as described above. The maximum value and the minimum value among the values of the thickness measured at at least 30 measurement points are defined as the maximum value Tmax of thickness of the resin film and the minimum value Tmin of thickness of the resin film, respectively, and the average value of the values is defined as the average value Tave of thickness of the resin film.

Since the resin film according to the present invention has small thickness variation Tv that is determined in such a manner as described above, uneven concentration of stress upon bending the resin film is less likely to occur. Consequently, the resin film according to the present invention exerts an effect that the resin film is less likely to break.

(Phase Difference Variation and Orientation Variation of Resin Film)

When the resin film according to the present invention is an optical film to which optical properties are given, the phase difference variation and orientation variation of the resin film are usually also small similar to the thickness variation being small. Therefore, according to the present invention, it is possible to provide an excellent optical film.

(Internal Haze of Resin Film)

The resin film according to the present invention preferably has a small internal haze. Herein, haze usually includes one caused by light scattering due to minute surface irregularities of the resin film and one caused by inner refractive index distribution. The internal haze is determined by deducting the haze caused by light scattering due to minute surface irregularities of the resin film from the normal haze. Such an internal haze may be measured by a method such as the one that will be described later as one of evaluation items in the section of Examples.

The internal haze of the resin film is preferably 3% or less, more preferably 2% or less, even more preferably 1% or less, and particularly preferably 0.5% or less. The internal haze of the resin film is ideally 0%, but the lower limit thereof may be more than 0%.

(Transparency of Resin Film)

The resin film according to the present invention is preferably excellent in transparency. Specifically, the total light transmittance of the resin film according to the present invention is preferably 80 or more, more preferably 85% or more, and particularly preferably 88% or more.

The total light transmittance of the resin film may be measured in the wavelength range of 400 nm to 700 nm using an ultraviolet-visible spectrometer.

(Optical Properties of Resin Film)

The resin film according to the present invention may have a retardation depending on the use application. For example, when the resin film according to the present invention is used as an optical film such as a phase difference film or an optical compensation film, the resin film preferably has a retardation.

(Thickness of Resin Film)

The thickness of the resin film according to the present invention may be appropriately selected depending on the desired use application, and is preferably 1 µm or more, more preferably 3 µm or more, and particularly preferably 10 µm or more, and is preferably 1 mm or less, more preferably 500 µm or less, and particularly preferably 200 µm or less. The thickness of the resin film is equal to or more than the lower limit value of the aforementioned range, appropriate level of strength can be obtained. The thickness thereof is equal to or less than the upper limit value, winding in producing a long-length film can be made possible. Since the thickness variation of the resin film according to the present invention is small, unevenness in winding when wound on a roll can be reduced and occurrence of wrinkles can be suppressed. In addition, since the resin film according to the present invention has small thickness variation, coating unevenness and unevenness in coating thickness can also be suppressed when a coating layer is formed on the surface.

(Use Application of Resin Film)

The resin film according to the present invention may be used for any use applications. Among others, the resin film according to the present invention is suitable as an optical film such as an optically isotropic film and a phase difference film, a film for electric and electronic use, a substrate film for a barrier film, and a substrate film for an electroconductive film. Examples of the optical film may include a phase difference film and a polarizing plate protective film for a liquid crystal display device, and a phase difference film for a circularly polarizing plate of an organic EL display device. Examples of the film for electric and electronic use may include a flexible wiring board, and an insulating material for a film condenser. Examples of the barrier film may include a substrate and a sealing film for an organic EL element, and a sealing film of a solar cell. Examples of the electroconductive film may include flexible electrodes of an organic EL element and a solar cell, and a touch panel member.

[2. Method for Producing Resin Film]

The resin film according to the present invention is produced by a method for producing a resin film including: a pre-heating step of pre-heating a first film formed of a resin containing a polymer containing an alicyclic structure and having crystallizability at a pre-heating temperature Tph falling within a range of a first temperature T1 or higher and a second temperature T2 or lower for a pre-heating time $t_{ph}$ in a state where at least two edges of the first film are held to obtain a second film; a stretching step of subjecting the second film to a stretching treatment at a stretching temperature Tst falling within a range of the first temperature T1 or higher and the second temperature T2 or lower to obtain a third film; and a thermal setting step of maintaining the third film at a thermal setting temperature Tts that is higher than the stretching temperature Tst and falls within a range of a third temperature T3 or higher and lower than a melting point Tm of the polymer for a thermal setting time $t_{ts}$ in a state where at least two edges of the third film are held. The temperature range and time of each of the steps will be described later. According to the above-described method for producing a resin film, a resin film excellent in strength and bend resistance can be produced from the resin containing a polymer containing an alicyclic structure and having crystallizability.

Detailed description of the method for producing a resin film will be given hereinbelow.

[2.1. Preparation of First Film]

Prior to carrying out the aforementioned method for producing a resin film, a step of preparing the first film is performed. The first film is a film formed of a crystallizable resin and having a desired thickness. Herein, the desired thickness of the first film may be optionally set in consideration of the stretching ratio in the subsequent stretching step. Such a thickness is usually 5 µm or more, and preferably 10 µm or more, and is usually 1 mm or less, and preferably 500 µm or less.

The first film may be produced by a resin molding method such as an injection molding method, an extrusion molding method, a press molding method, an inflation molding method, a blow molding method, a calendar molding method, a cast molding method, or a compression molding method. Among these, the first film is preferably produced by an extrusion molding method since thereby thickness is easily controlled. When the first film is produced by the extrusion molding method, the production conditions in the extrusion molding method are preferably as follows. The cylinder temperature (melted resin temperature) is preferably Tm or higher, and more preferably "Tm+20"° C. or higher, and is preferably "Tm+100"° C. or lower, and more preferably "Tm+50"° C. or lower. The casting roll temperature is preferably "Tg−50"° C. or higher, and is preferably "Tg+70"° C. or lower, and more preferably "Tg+40"° C. or lower. Further, the cooling roll temperature is preferably "Tg−70"° C. or higher, and more preferably "Tg−50"° C. or higher, and is preferably "Tg+60"° C. or lower, and more preferably "Tg+30"° C. or lower. When the first film is produced under such conditions, the first film having a thickness of 1 µm to 1 mm can be easily produced. Herein, "Tm" represents the melting point of the polymer containing an alicyclic structure, and "Tg" represents the glass transition temperature of the polymer containing an alicyclic structure.

[2.2. Pre-Heating Step]

In the method for producing a resin film according to the present invention, the pre-heating step is performed prior to the stretching step. The pre-heating step is performed to maintain the first film within a specific temperature range prior to the stretching step. For this purpose, in the pre-heating step, the first film is heated at a pre-heating temperature Tph for a pre-heating time $t_{ph}$ in a state where at least two edges of the first film are held. By holding at least two edges of the first film, deformation of the first film by thermal shrinkage in a region between the held edges can be suppressed. The pre-heating step and the stretching step are usually continuously performed, and therefore another step is not performed between the pre-heating step and the stretching step.

The pre-heating temperature Tph is the temperature of a heating atmosphere to which the first film is exposed in the pre-heating step, and is usually the same temperature as the set temperature of a heating device. The pre-heating temperature Tph is a temperature falling within a range of a first temperature T1 or higher and a second temperature T2 or lower. The heating device is preferably one that can heat the first film without being in contact with the film. Specific examples of such a heating device may include an oven and a heating furnace.

Herein, the first temperature T1 is the lower limit of the temperature range in which the pre-heating temperature Tph may fall, and is represented by the following formula (9), preferably by the following formula (9'), and more preferably by the following formula (9").

$$T1[°C.]=(5\times Tg+5\times Tpc)/10 \tag{9}$$

$$T1[°C.]=[(5\times Tg+5\times Tpc)/10]+5 \tag{9'}$$

$$T1[°C.]=[(5\times Tg+5\times Tpc)/10]+10 \tag{9"}$$

In the above-described formulae (9), (9'), and (9"), Tg is the glass transition temperature of the polymer contained in the crystallizable resin, and Tpc is the crystallization peak temperature of the polymer contained in the crystallizable resin. As can be seen from the above-described formulae (9), (9'), and (9"), the first temperature T1 is usually higher than the glass transition temperature Tg and lower than the crystallization peak temperature Tpc.

When the pre-heating temperature Tph is the first temperature T1 or higher, a reduction in the thickness uniformity that may occur in the subsequent thermal setting step can be significantly suppressed.

The second temperature T2 is the upper limit of the temperature range in which the pre-heating temperature Tph may fall, and is represented by the following formula (10), preferably by the following formula (10'), and more preferably by the following formula (10"). As can be seen from the following formulae (10), (10'), and (10"), the second temperature T2 is usually higher than the crystallization peak temperature Tpc and lower than the melting point Tm.

$$T2[°C.]=(9\times Tpc+1\times Tm)/10 \tag{10}$$

$$T2[°C.]=[(9\times Tpc+1\times Tm)/10]-5 \tag{10'}$$

$$T2[°C.]=[(9\times Tpc+1\times Tm)/10]-10 \tag{10"}$$

When the pre-heating temperature Tph is the second temperature T2 or lower, stretching defect that may occur in the subsequent stretching step can be suppressed and a reduction in thickness uniformity that may occur in the subsequent thermal setting step can be significantly suppressed. Further, when the pre-heating temperature Tph is the second temperature T2 or lower, haze of the resulting resin film can be reduced and whitening can thereby be suppressed.

The pre-heating time $t_{ph}$ is the time during which the first film is maintained within a specific temperature range prior to the stretching step, that is, the time during which the first film is exposed to a heating atmosphere in the pre-heating step. Herein, the specific temperature range is the same as the temperature range in which the pre-heating temperature Tph may fall. That is, the specific temperature range is a temperature falling within a range of the first temperature T1 or higher and the second temperature T2 or lower.

Herein, the upper limit $t_{ph}(max)$ of the pre-heating time $t_{ph}$ is represented by the following formula (11), preferably by the following formula (11'), and more preferably by the following formula (11").

$$t_{ph}(max)\ [sec]=80\times[(T1-Tph)/(T2-T1)]+90 \tag{11}$$

$$t_{ph}(max)\ [sec]=0.8\times[80\times\{(T1-Tph)/(T2-T1)\}+90] \tag{11'}$$

$$t_{ph}(max)\ [sec]=0.6\times[80\times\{(T1-Tph)/(T2-T1)\}+90] \tag{11"}$$

When the pre-heating time $t_{ph}$ is the upper limit $t_{ph}(max)$ or less, stretching defect that may occur in the subsequent stretching step can be suppressed and a reduction in the thickness uniformity that may occur in the subsequent thermal setting step can be significantly suppressed. Further, when the pre-heating time $t_{ph}$ is the upper limit $t_{ph}(max)$ or less, haze of the resulting resin film can be reduced and thereby whitening can be prevented.

The lower limit $t_{ph}(min)$ of the pre-heating time $t_{ph}$ is 1 second, and preferably 5 seconds. This makes it possible to prevent the first film from being unevenly heated. Consequently, a reduction in the thickness uniformity caused by stretching defect in the subsequent stretching step can be suppressed.

The above-described "state where at least two edges of the first film are held" refers to a state where the first film is held by a holding tool or two separate rollers to such a degree that the first film does not sag. However, this state does not include a state where the first film is held so as to be substantially stretched. The phrase "substantially stretched" means that the stretching ratio of the first film in any direction is usually 1.03 times or more.

When the first film is held, an appropriate holding tool is used to hold the first film. The holding tool may be one that can continuously hold the edges of the first film over the entire length thereof or one that can intermittently hold the edges of the first film at intervals. For example, the edges of the first film may be intermittently held by holding tools disposed at specific intervals. In the case of the first film in a sheet piece shape, it is preferable that all the edges of the first film are held. Specifically, in the case of the first film in a rectangular sheet piece shape, it is preferable that the four edges of the first film are held. This makes it possible to more reliably suppress deformation in the pre-heating step.

The holding tool that can hold the edges of the first film is preferably one that does not come into contact with a portion other than the edges of the first film. By using such a holding tool, it is possible to obtain a resin film having more excellent smoothness.

It is preferable that the holding tools are capable of fixing the relative positions therebetween in the pre-heating step. When such holding tools are used, the relative positions of the holding tools do not change in the pre-heating step, and therefore substantial stretching of the first film in the pre-heating step can be easily suppressed.

For example, the holding tools for holding a rectangular first film are preferably grippers, such as clips, that are provided on a frame at specific intervals so as to be able to grip the edges of the first film. The holding tools for holding two edges at the width-direction ends of a long-length first film are, for example, grippers that are provided in a tenter stretching machine so as to be able to grip the edges of the first film.

When a long-length first film is used, edges at the lengthwise-direction ends (i.e., short edges) of the first film may be held. Instead of holding the aforementioned edges, the both sides of a region in the lengthwise direction of the first film to be subjected to a pre-heating treatment may be held. For example, holding devices that can hold the first film to prevent thermal shrinkage may be provided on both sides of a region in the lengthwise direction of the first film to be subjected to the pre-heating treatment. Examples of such holding devices may include a combination of two rolls and a combination of an extruder and a take-up roll. By holding the first film with the use of such a combination of holding devices, thermal shrinkage of the first film in a region where the first film is subjected to the pre-heating treatment can be suppressed. Therefore, by using such a combination as the holding devices, the first film can be held while feeding the film in a conveyance direction, which makes it possible to efficiently produce a resin film.

By performing the pre-heating step in such a manner as described above, a second film can be obtained as the pre-heated first film.

[2.3. Stretching Step]

In the method for producing a resin film according to the present invention, the stretching step of stretching the second film obtained in the preheating step is performed. This stretching step is initiated with the second film in a temperature falling within the above-mentioned specific temperature range. Therefore, in the stretching step, the second film is subjected to a stretching treatment at the stretching temperature Tst.

The stretching temperature Tst is the temperature of a heating atmosphere to which the second film is exposed in the stretching step, and is usually the same temperature as the set temperature of the stretching machine. This stretching temperature Tst is a temperature falling within the first temperature T1 or higher and the second temperature T2 or lower. Therefore, the same temperature as the preheating temperature Tph may be set as the stretching temperature Tst, and the temperature difference between the stretching temperature Tst and the preheating temperature Tph in this case is preferably 5° C. or less, and more preferably 2° C. or less. When such a temperature is set as the stretching temperature Tst, the polymer molecules contained in the second film can be appropriately oriented.

The stretching method for the second film is not particularly limited, and may adopt any stretching method. Examples of the stretching method may include a uniaxial stretching method such as a method of uniaxially stretching the second film in a lengthwise direction (longitudinal uniaxial stretching method) and a method of uniaxially stretching the second film in a width direction (transversal uniaxial stretching method); a biaxial stretching method such as a simultaneous biaxial stretching method of stretching the second film in the width direction at the same time as stretching the second film in the lengthwise direction and a sequential biaxial stretching method of stretching the second film in one of the lengthwise and width directions, followed by stretching the second film in the other direction; and a method of stretching the second film in an oblique direction that is not parallel to or perpendicular to the width direction (oblique stretching method).

Examples of the longitudinal uniaxial stretching may include a stretching method utilizing a difference in a peripheral speed between rolls.

Examples of the transversal uniaxial stretching method may include a stretching method using a tenter stretching machine.

Examples of the simultaneous biaxial stretching method described above may include a stretching method using a tenter stretching machine equipped with a plurality of clips that are provided so as to be movable along a guide rail and capable of fixing the second film, wherein the second film is stretched in the lengthwise direction by increasing intervals between the clips, and simultaneously stretched in the width direction using a spreading angle of the guide rail.

Examples of the sequential biaxial stretching method may include a stretching method in which the second film is stretched in the lengthwise direction using a difference in a peripheral speed between rolls, thereafter both ends of the second film are gripped by clips, and the second film is stretched in the width direction by a tenter stretching machine.

Examples of the oblique stretching method may include a stretching method in which the second film is continuously stretched in the oblique direction using a tenter stretching machine that is capable of applying a feeding force, a pulling force, or a drawing force to the second film at different speeds on left and right sides in the lengthwise or width direction.

The stretching ratio for stretching the second film may be appropriately selected depending on the desired optical properties, thickness, strength, and the like, and is usually 1.03 times or more, preferably 1.1 times or more, and more preferably 1.2 times or more, and is preferably 20 times or less, more preferably 10 times or less, and particularly preferably 5 times or less. Herein, when the stretching is performed in a plurality of different directions such as a case of the biaxial stretching method, the stretching ratio means a total stretching ratio that is represented by product of stretching ratios in the respective stretching directions. When the stretching ratio is equal to or less than the upper limit value of the aforementioned range, a possibility of breaking the film can be reduced. Therefore, the resin film can be easily produced. The time required for stretching treatment may be set depending on the stretching ratio.

By applying the stretching treatment as described above to the second film, the third film as a stretched second film is obtained, and a resin film having desired properties can be obtained by using such a third film.

[2.4. Thermal Setting Step]

In the method for producing a resin film according to the present invention, the thermal setting step is performed. The thermal setting step is performed to promote crystallization of the polymer containing an alicyclic structure contained in the third film. In the thermal setting step, the third film is maintained at the thermal setting temperature Tts in a state where at least two edges of the third film are held. This makes it possible to usually increase the crystallization degree of the polymer containing an alicyclic structure from lower than 30% to 30% or higher. Further, by holding at least two edges of the third film, it is possible to prevent the third film from being deformed by thermal shrinkage in its region between the held edges. When the crystallization degree is increased to 30% or higher, strength of the resin film can be made excellent.

The above-described "state where at least two edges of the third film are held" is the same as the above-described "state where at least two edges of the first film are held", and therefore the description thereof will not be repeated. The holding tool is also the same, and therefore the description thereof will not be repeated.

The thermal setting temperature Tts is the temperature of a heating atmosphere to which the third film is exposed in the thermal setting step, and is usually the same temperature as the set temperature of a heating device. The thermal setting temperature Tts is a temperature that is higher than the stretching temperature Tst and falls within a range of a third temperature T3 or higher and lower than the melting point $T_m$ of the polymer. The thermal setting temperature Tts is preferably higher than the pre-heating temperature Tph. The heating device is preferably one that can heat the third film without being in contact with the third film. Specific examples of such a heating device may include an oven and a heating furnace. When the above-described temperature range is adopted, whitening of the resulting resin film can be suppressed.

Herein, the third temperature T3 is the lower limit of the temperature range in which the thermal setting temperature Tts can may fall, and is represented by the following formula (12), preferably by the following formula (12'), and more preferably by the following formula (12"). As can be seen from the following formulae (12), (12'), and (12"), the third temperature T3 is usually higher than the crystallization peak temperature Tpc and lower than the melting point Tm.

$$T3 [°C.] = [(9 \times Tpc + 1 \times Tm)/10] \quad (12)$$

$$T3 [°C.] = [(9 \times Tpc + 1 \times Tm)/10] + 10 \quad (12')$$

$$T3 [°C.] = [(9 \times Tpc + 1 \times Tm)/10] + 20 \quad (12'')$$

The thermal setting temperature Tts preferably falls within a range of the third temperature T3 or higher and a fourth temperature T4 or lower. The fourth temperature T4 is the upper limit of a temperature range in which the thermal setting temperature Tts may fall, and is set such that the thermal setting temperature Tts does not even locally reach the melting point Tm.

Herein, the fourth temperature T4 is preferably represented by the following formula (13), more preferably by the following formula (13'), and even more preferably by the following formula (13"). As can be seen from the following formulae (13), (13'), and (13"), the fourth temperature T4 is higher than the crystallization peak temperature Tpc and lower than the melting point Tm.

$$T4 [°C.] = [(2 \times Tpc + 8 \times Tm)/10] \quad (13)$$

$$T4 [°C.] = [(2 \times Tpc + 8 \times Tm)/10] - 20 \quad (13')$$

$$T4 [°C.] = [(2 \times Tpc + 8 \times Tm)/10] - 40 \quad (13'')$$

The thermal setting time $t_{ts}$ during which the thermal setting step is performed is 5 seconds or more. Herein, the thermal setting time $t_{ts}$ is the time during which the third film with at least two edges thereof being held for preventing thermal shrinkage is maintained within a specific temperature range. The specific temperature range is the same as the temperature range in which the thermal setting temperature $T_{ts}$ may fall. That is, the specific temperature range is the temperature falling within a range of the third temperature T3 or higher and the fourth temperature T4 or lower. Preferably, the thermal setting time $t_{ts}$ is 90 seconds or less.

When the thermal setting time $t_{ts}$ is 5 seconds or more, the crystallization degree of the polymer can be sufficiently increased to make the strength of the resin film excellent. Further, when the thermal setting time $t_{ts}$ is 90 seconds or less, whitening of the resulting resin film can be suppressed, and therefore a resin film suitable for use as an optical film can be obtained. Therefore, it is more preferable that the thermal setting time $t_{ts}$ falls within a range of 5 seconds or more and 90 seconds or less.

In the thermal setting step, the above-described "state where at least two edges of the third film are held" is preferably a "state where at least two edges of the third film are held under tension". The "state where at least two edges of the third film are held under tension" means that the third film is held under tension at a certain degree with which the third film does not come into the state of being stretched. This is because thermal shrinkage due to exposure of the third film to a higher temperature in the thermal setting step than in the pre-heating step and the stretching step is preferably taken into consideration. This makes it possible to promote crystallization without impairing the smoothness of the third film.

By subjecting the third film to the above-described thermal setting treatment, it is possible to obtain a fourth film as the crystallization-promoted third film.

[2.5. Relaxation Step]

In the present invention, a relaxation step is preferably performed after the thermal setting step in order to cause thermal shrinkage of the fourth film obtained in the thermal setting step to remove residual stress. In the relaxation step, the fourth film obtained in the thermal setting step is subjected to a relaxation treatment in a specific temperature range to relax the tension of the fourth film while being maintained flat.

The phrase "to relax the tension of the fourth film" means that the fourth film is released from a state where it is held under tension by the holding device, and the fourth film may be in a state of being held by the holding device as long as tension is not applied to the fourth film. When tension is relaxed in this way, the fourth film is put into a state of being thermally shrinkable. In the relaxation step, the fourth film is allowed to thermally shrink to eliminate stress that may be generated in the resin film during heating. This makes it possible to reduce thermal shrinkage of the resin film according to the present invention in a high-temperature environment. Therefore, it is possible to obtain a resin film excellent in size stability in a high-temperature environment.

The relaxation of tension of the fourth film may be performed at a time or may be performed in a continuous or stepwise manner over a period of time. However, in order to prevent the resulting resin film from being deformed by, for example, waving or wrinkling, the relaxation of tension is preferably performed in a continuous or stepwise manner.

The relaxation of tension of the fourth film is performed while the fourth film is maintained flat. Herein, the phrase "the fourth film is maintained flat" means that the fourth film is maintained in a planar shape to prevent the fourth film from being deformed by, for example, waving or wrinkling. This makes it possible to prevent the resulting resin film from being deformed by, for example, waving or wrinkling.

The difference between the temperature for relaxation treatment performed on the fourth film and the thermal setting temperature Tts in the thermal setting step is preferably 20° C. or less, and more preferably in a range of 10° C. or less. This makes it possible to reduce variations in the temperature of the fourth film in the relaxation step and to increase the productivity of the resin film.

In the relaxation step, the treatment time during which the fourth film is maintained within the above-described temperature range is preferably 1 second or more, and more preferably 5 seconds or more. The upper limit of the treatment time is preferably set such that the total of the thermal setting time $t_{ts}$ and the treatment time in the relaxation step is 90 seconds or less (i.e., thermal setting time $t_{ts}$+treatment time of relaxation step ≤90 seconds) and twice the thermal setting time $t_{ts}$ is equal to or more than the treatment time in the relaxation step (i.e., thermal setting time $t_{ts}$×2≥treatment time in relaxation step). When the treatment time is equal to or more than the lower limit value of the above-described range, size stability of the resin film according to the present invention in a high-temperature environment can be effectively enhanced. Further, when the treatment time is equal to or less than the upper limit value, size stability of the resin film according to the present invention in a high-temperature environment can be effectively enhanced and whitening of the resin film due to the progression of crystallization in the relaxation step can be suppressed.

When the fourth film in a sheet piece shape is subjected to the relaxation treatment in the above-described relaxation step, for example, a method in which the four edges of the fourth film are held, and intervals between held portions are narrowed in a continuous or stepwise manner may be adopted. In this case, the intervals between held portions at the four edges of the fourth film may be simultaneously narrowed. Alternatively, the intervals between held portions at a part of the edges may be narrowed, and then the intervals between held portions at another part of the edges may be narrowed. Further, the intervals between held portions at a part of the edges may be maintained without being narrowed. Alternatively, the intervals between held portions at a part of the edges may be narrowed in a continuous or stepwise manner, and the intervals between held portions at another part of the edges may be narrowed at a time.

When a long-length fourth film is subjected to the relaxation treatment in the above-described relaxation step, for example, a method may be used in which, with the use of a tenter stretching machine, an interval between guide rails that can guide clips is narrowed in the conveyance direction of the fourth film or intervals between adjacent clips are narrowed.

As described above, when the tension of the fourth film is relaxed by narrowing the intervals between held portions in a state where the fourth film is held, the degree of narrowing the intervals may be set depending on the magnitude of stress remaining in the fourth film obtained in the thermal setting step.

Usually, the fourth film obtained in the thermal setting step has already been subjected to the stretching treatment, and therefore tends to contain a large stress remaining therein. Therefore, the degree of narrowing the intervals for relaxing the tension of the fourth film is preferably greater than that when a film that has not been subjected to the stretching treatment is used.

The degree of narrowing the intervals between held portions in the relaxation step may be determined on the basis of a thermal shrinkage ratio S (%) measured in an instance where tension is not applied to the fourth film at the treatment temperature of the fourth film in the relaxation step. Specifically, the degree of narrowing the intervals between held portions is usually 0.1 S or more, preferably 0.5 S or more, and more preferably 0.7 S or more, and is usually 1.2 S or less, preferably 1.0 S or less, and more preferably 0.95 S or less. Further, when the thermal shrinkage ratio S is anisotropic such as when the thermal shrinkage ratios S in two orthogonal directions are different, the degree of narrowing the intervals between held portions may be set within the above-described range in each of the directions. When the degree of narrowing the intervals falls within such a range, the residual stress of the resin film can be sufficiently removed and the flatness of the resin film can be maintained.

The thermal shrinkage ratio S of the fourth film may be measured in the following manner.

The fourth film is cut to have a square shape with a size of 150 mm×150 mm in an environment with a room temperature of 23° C. to prepare a sample film. This sample film is heated in an oven set at the same temperature as the treatment temperature in the relaxation step for 60 minutes and then cooled to 23° C. (room temperature). Then, the lengths of two edges parallel to a direction in which the thermal shrinkage ratio S of the sample film is to be determined are measured.

The thermal shrinkage ratio S of the sample film is calculated by the following formula (III) on the basis of the measured length of each of the two edges. In the formula (III), $L_1$ (mm) is the measured length of one of the two edges of the heated sample film, and $L_2$ (mm) is the length of the other edge.

$$\text{Thermal shrinkage ratio } S\ (\%)=[(300-L_1-L_2)/300]\times 100 \qquad \text{(III)}$$

By subjecting the fourth film to such a relaxation treatment as described above, it is possible to obtain a resin film as an object to be produced. When a relaxation treatment is not performed, the fourth film is the resin film.

[2.6. First Example of Thermal Setting Step and Relaxation Step]

A first example of the above-described thermal setting step and relaxation step will be described below. The first example is an example of a method in which a resin film in a sheet piece shape is produced using a third film in a sheet piece shape. However, the thermal setting step and the relaxation step are not limited to this first example.

Figure 2:
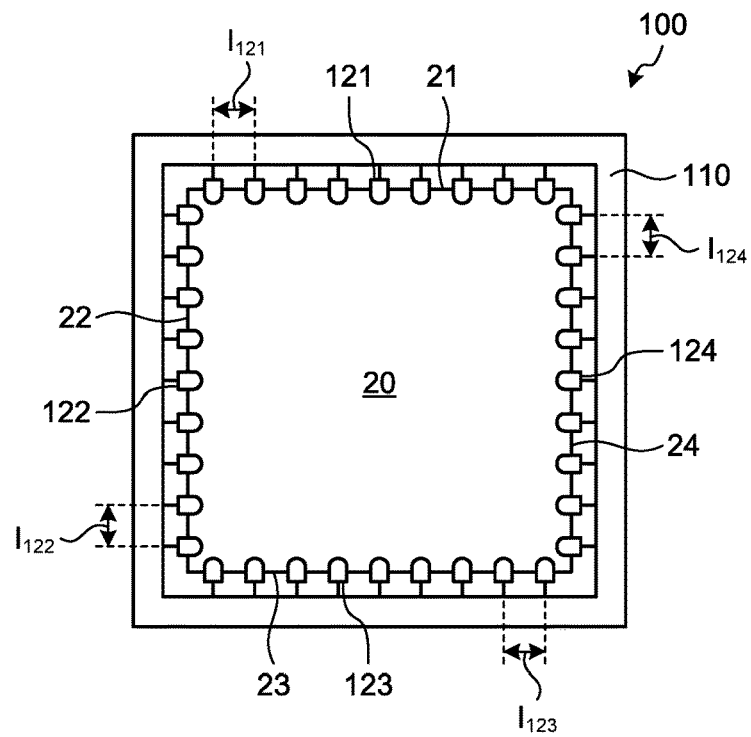
FIG. 2 is a plan view schematically illustrating an example of a holding device.

FIGS. 1 and 2 are plan views schematically illustrating an example of a holding device.

As illustrated in FIG. 1, a holding device 100 is a device for holding a third film 10 in a sheet piece shape. The holding device 100 includes a frame 110 and clips 121, 122, 123, and 124 provided as a plurality of holding tools on the frame 110 so as to be able to adjust their positions. The clips 121, 122, 123, and 124 are provided so as to be able to grip edges 11, 12, 13, and 14 of the third film 10, respectively.

In the case of performing the thermal setting step using such a holding device 100, the third film 10 formed of a resin containing a polymer containing an alicyclic structure is attached to the holding device 100. Specifically, the third film 10 is gripped by the clips 121 to 124 so that the four edges 11 to 14 of the third film 10 are held. Then, the third film 10 held in such a state is heated at a thermal setting temperature Tts in an oven that is not illustrated.

As a result, crystallization of the polymer containing an alicyclic structure contained in the third film 10 progresses so that a fourth film 20 is obtained as illustrated in FIG. 2. At this time, since the third film 10 is in a state where its four edges 11 to 14 are held, the fourth film 20 is not deformed by thermal shrinkage. Therefore, stress that promotes generation of thermal shrinkage usually remains in the fourth film 20.

After that, the fourth film 20 produced in the aforementioned manner is subjected to the relaxation step. At the time point when the thermal setting step is completed, the fourth film 20 is kept in a state where the edges 21, 22, 23, and 24 of the fourth film 20 are held by the clips 121, 122, 123, and 124 of the holding device 100. In the relaxation step, intervals $I_{121}$ between the clips 121 of the holding device 100, intervals $I_{122}$ between the clips 122 of the holding device 100, intervals $I_{123}$ between the clips 123 of the holding device 100, and intervals $I_{124}$ between the clips 124 of the holding device 100 are narrowed while keeping a state where the fourth film 20 is continuously heated to a temperature that is in a range of 20° C. or less from the thermal setting temperature $T_{ts}$. As a result, narrowing of the intervals between portions of the fourth film 20 held by the clips 121 to 124 are achieved in a manner such that the narrowing follows the size change of the fourth film 20 due to thermal shrinkage. Consequently, the tension of the fourth film 20 is relaxed while the fourth film 20 is maintained flat so that a resin film in a sheet piece shape is obtained.

In the resin film thus obtained, stress that may cause a size change in a high-temperature environment is eliminated. Therefore, the obtained resin film can have improved size stability in a high-temperature environment. Further, since the polymer containing an alicyclic structure contained in the resin film is crystallized, the resin film usually has excellent heat resistance.

[2.7. Second Example of Thermal Setting Step and Relaxation Step]

A second example of the above-described thermal setting step and relaxation step will be described below. The second example is an example of a method in which a long-length resin film is produced using a long-length third film. However, the thermal setting step and the relaxation step are not limited to this second example.

Figure 3:
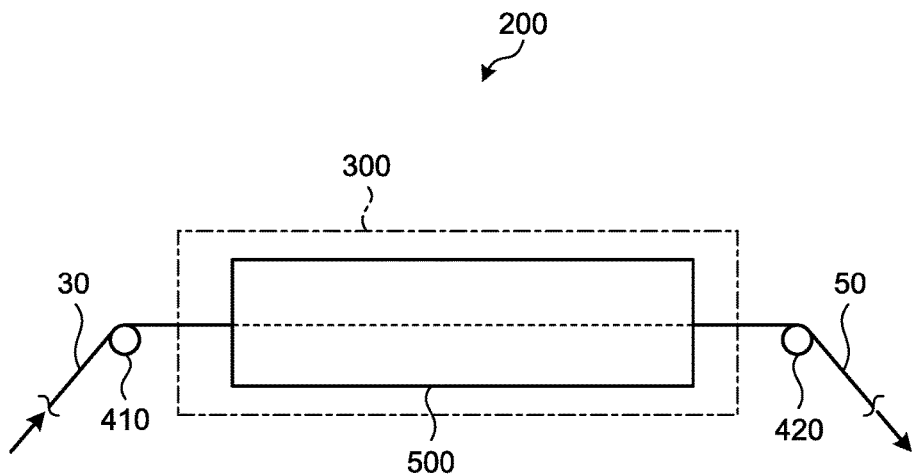
FIG. 3 is a front view schematically illustrating an example of an apparatus for producing a resin film.
Figure 4:
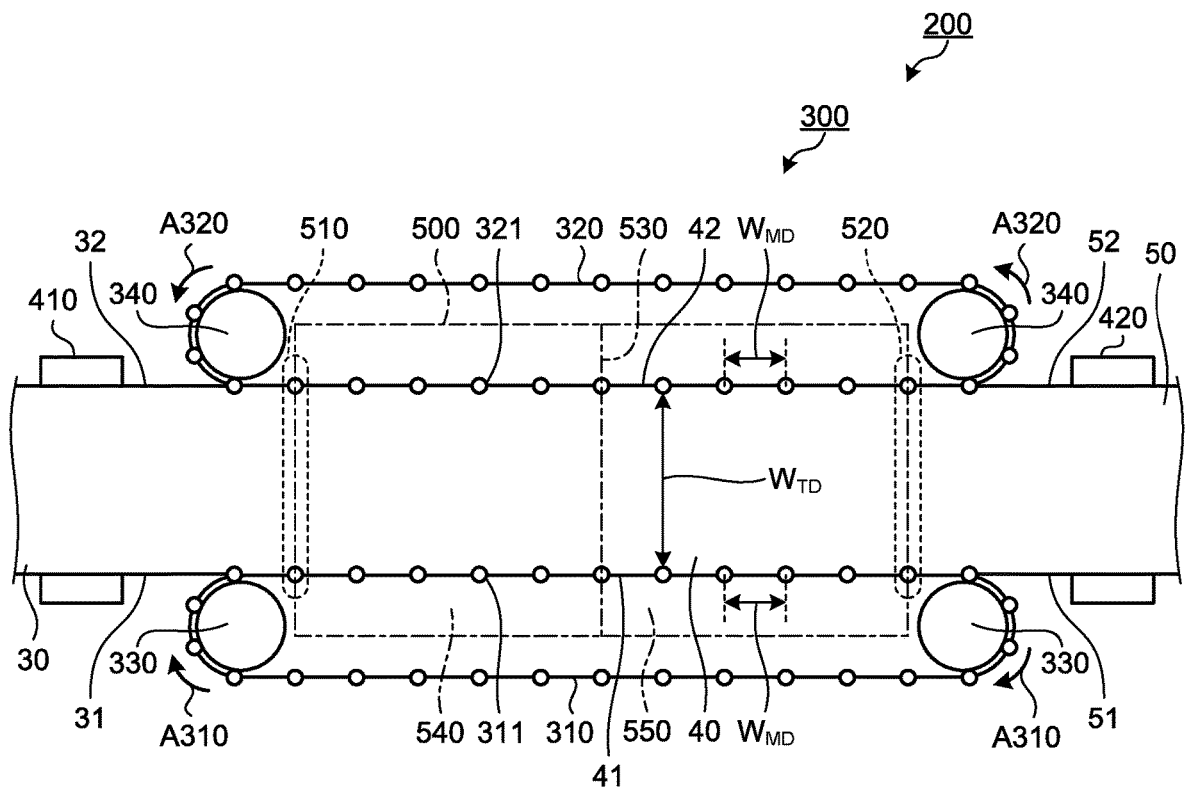
FIG. 4 is a plan view schematically illustrating the example of the apparatus for producing a resin film.

FIG. 3 is a front view schematically illustrating an example of an apparatus for producing a resin film, and FIG. 4 is a plan view schematically illustrating the example of the apparatus for producing a resin film.

As illustrated in FIGS. 3 and 4, a production apparatus 200 includes a tenter stretching machine 300 as a holding device, conveyance rolls 410 and 420, and an oven 500 as a heating device.

As illustrated in FIG. 4, the tenter stretching machine 300 includes endless link devices 310 and 320 provided on both left and right sides of a film conveyance path, and sprockets 330 and 340 for driving the link devices 310 and 320. The link devices 310 and 320 are provided with a plurality of clips 311 and a plurality of clips 321 as holding tools, respectively.

The clips 311 and 321 are provided so as to grip edges 31 and 32 at width-direction ends of a third film 30, edges 41 and 42 at width-direction ends of a fourth film 40, and edges 51 and 52 at width-direction ends of a resin film 50 to hold the third film 30. Further, these clips 311 and 321 are provided so as to be movable by the rotation of the link devices 310 and 320.

The link device 310 and 320 are provided so as to be driven by the sprockets 330 and 340 and rotatable as shown by arrows A310 and A320 along circulating tracks defined by unillustrated guide rails provided on both sides of the film conveyance path. Therefore, the clips 311 and 321 provided on the link devices 310 and 320 are configured so as to be movable along desired circulating tracks on both sides of the film conveyance path.

The clips 311 and 321 are provided so as to, by any appropriate mechanism, hold the two edges 31 and 32 of the third film 30 at a place near an inlet 510 of the oven 500, move in a film conveyance direction associated with the rotation of the link devices 310 and 320 while keeping the holding of the two edges 31 and 32, and release the resin film 50 at a place near an outlet 520 of the oven 500.

The tenter stretching machine 300 is configured so as to freely adjust intervals $W_{MD}$ between the clips 311 and intervals $W_{MD}$ between the clips 321 in the film conveyance direction and intervals $W_{TD}$ between the clip 311 and the clip 321 in the width direction. The example shown here is an example in which the intervals $W_{MD}$ between the clips 311, the intervals $W_{MD}$ between the clips 321, and the intervals $W_{TD}$ between the clip 311 and the clip 321 are adjustable by the pantograph-type link devices 310 and 320.

Figure 5:
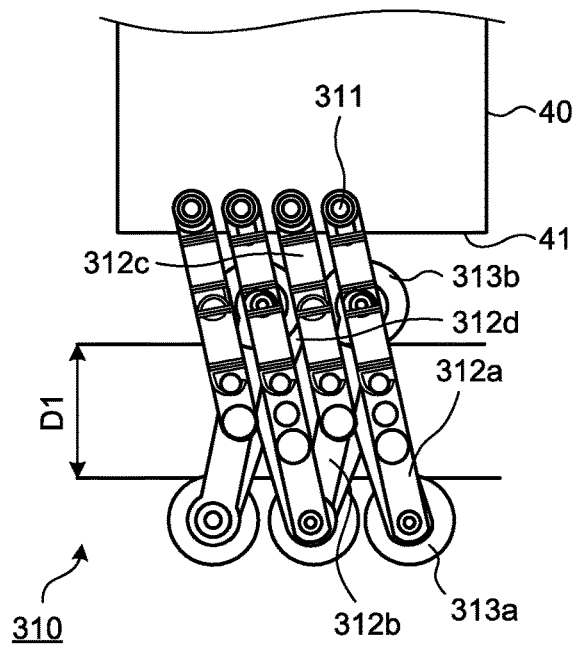
FIG. 5 is a plan view schematically illustrating a part of a linking device.
Figure 6:
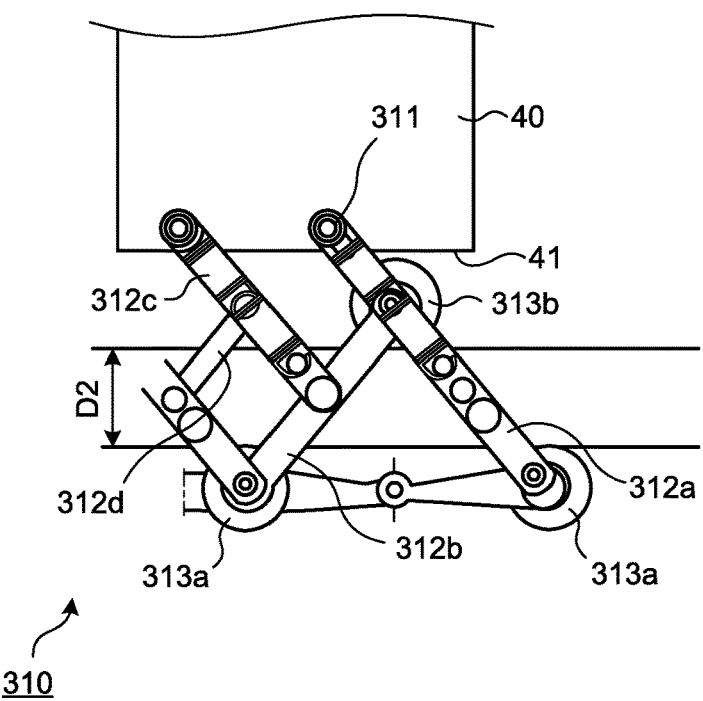
FIG. 6 is a plan view schematically illustrating a part of the linking device.

FIGS. 5 and 6 are plan views schematically illustrating a part of the link device 310.

As illustrated in FIGS. 5 and 6, the link device 310 includes a plurality of link plates 312a to 312d linked together. In the link device 310 shown in this example, the link plates 312a to 312d are annularly linked. This allows the link device 310 to be endless.

The link device 310 further includes bearing rollers 313a and 313b. These bearing rollers 313a and 313b are provided so as to be able to travel in grooves formed by the guide rails not illustrated. Therefore, by adjusting the track of the guide rail, the circulating track of the link device 310 rotated along the guide rail can be adjusted, and further the travelling track of the clips 311 provided in the link device 310 can be adjusted. Therefore, the link device 310 is configured so that the positions of the clips 311 can be changed in the width direction at any position in the film conveyance direction by adjusting the track of the guide rail. Thus, the intervals $W_{TD}$ between the clip 311 and the clip 321 in the width direction can be changed by changing the positions of the clips 311 in the width direction.

As illustrated in FIGS. 5 and 6, one unit of the link device 310 includes: (a) the link plate 312a that has a point of support on each of the outside bearing roller 313a and the inside bearing roller 313b, further extends inwardly, and has the clip 311 at the inner end thereof; (b) the link plate 312b that shares a point of support with the link plate 312a on the bearing roller 313b and extends to another point of support on another bearing roller 313a; (c) the link plate 312c that has a point of support between the points of support of the link plate 312b, extends inwardly from the point of support, and has the clip 311 at the inner end thereof; and (d) the link plate 312d that has a point of support between the inner end and outer end of the link plate 312c, extends outwardly from the point of support, and has a point of support on the link plate 312a of another unit adjacent thereto. Herein, the term "outer" refers to the side away from the film conveyance path, and the term "inner" refers to the side close to the film conveyance path. The link pitch of such a link device 310 can be changed between a contraction state and an expansion state depending on the intervals D1 and D2 between the grooves of guide rollers. Therefore, the link device 310 is configured so that the intervals $W_{MD}$ between the clips 311 can be changed in the film conveyance direction at any position in the film conveyance direction by adjusting the interval between the grooves of the guide rollers to D1 or D2.

The other link device 320 has the same structure as that of the link device 310 except that the link device 320 is provided on the opposite side of the film conveyance path from the link device 310. Therefore, the link device 320 is also configured so that the intervals $W_{MD}$ between the clips 321 in the film conveyance direction and the positions of the clips 321 in the width direction can be adjusted in the same manner as that for the link device 310.

As illustrated in FIGS. 3 and 4, the conveyance rolls 410 and 420 are provided on both sides in the film conveyance direction of the tenter stretching machine 300. The conveyance roll 410 provided upstream of the tenter stretching machine 300 is provided to convey the third film 30, and the conveyance roll 420 provided downstream of the tenter stretching machine 300 is provided to convey the resin film 50. These conveyance rolls 410 and 420 are provided so as to be capable of holding the third film 30 for conveyance. Therefore, these conveyance rolls 410 and 420 can function as holding devices that can hold the third film 30 on both sides in the lengthwise direction of the tenter stretching machine 300 (corresponding to a region of the third film 30 subjected to the thermal setting treatment) so as not allow the third film 30 to cause thermal shrinkage.

As illustrated in FIG. 4, the oven 500 has a partition 530. The space in the oven 500 is divided by the partition 530 into an upstream thermal setting chamber 540 and a downstream relaxation chamber 550.

When the resin film 50 is produced using such a production apparatus 200, the long-length third film 30 formed of a resin containing a polymer containing an alicyclic structure is fed to the tenter stretching machine 300 through the conveyance roll 410.

As illustrated in FIG. 4, the third film 30 fed to the tenter stretching machine 300 is gripped by the clips 311 and 321 at the place near the inlet 510 of the oven 500, so that the two edges 31 and 32 are held by the clips 311 and 321. The third film 30 held by the clips 311 and 321 is preferably in a state where tension is applied to the third film 30 by holding by the clips 311 and 321 and holding by the conveyance rolls 410 and 420. Then, the third film 30 is conveyed into the thermal setting chamber 540 in the oven 500 through the inlet 510 while being held in such a manner as described above.

In the thermal setting chamber 540, the third film 30 is heated at a thermal setting temperature $T_{ts}$ to perform the thermal setting step. As a result, the crystallization of the polymer containing an alicyclic structure contained in the third film 30 progresses so that the fourth film 40 is obtained. At this time, the third film 30 is in a state where the two edges 31 and 32 of the third film 30 are held and the third film is held by the conveyance rolls 410 and 420, and therefore the fourth film 40 is not deformed by thermal shrinkage. Therefore, stress that promotes generation of thermal shrinkage usually remains in the fourth film 40.

Then, the fourth film 40 thus produced is fed into the relaxation chamber 550 in the oven 500 in a state where the two edges 41 and 42 are held by the clips 311 and 321. In the relaxation chamber 550, the intervals $W_{MD}$ between the clips 311 and the intervals $W_{MD}$ between the clips 321 in the film conveyance direction and the intervals $W_{TD}$ between the clips 311 and 321 in the width direction are narrowed while keeping a state where the fourth film 40 is continuously heated to a temperature that is in a range of 20° C. or less from the thermal setting temperature $T_{ts}$. As a result, narrowing of the intervals between portions of the fourth film 40 held by the clips 311 and 321 are achieved in a manner such that the narrowing follows the size change of the fourth film 40 due to thermal shrinkage. Therefore, the tension of the fourth film 40 is relaxed while the fourth film 40 is maintained flat, so that the long-length resin film 50 is obtained.

The resin film 50 is fed out of the oven 500 through the outlet 520. Then, the resin film 50 is released from the clips 311 and 321 at the place near the outlet 520 of the oven 500, fed through the conveyance roll 420, and collected.

In the resin film 50 thus obtained, stress that may cause a size change in a high-temperature environment is eliminated. Therefore, the obtained resin film 50 can have improved size stability in a high-temperature environment. Further, since the polymer containing an alicyclic structure contained in the resin film 50 is crystallized, the resin film 50 usually has excellent heat resistance.

[2.8. Optional Steps]

The method for producing the resin film according to the present invention may further include an optional step performed in combination with the above-described preheating step, stretching step, thermal setting step, and relaxation step.

For example, a surface treatment may be performed on the obtained resin film.

[3. Electroconductive Film]

Since the resin film according to the present invention is excellent in bend resistance as described above, when a film forming step including a high-temperature process such as a step of forming an inorganic layer is performed, a stress difference caused between the resin film and the electroconductive layer can be reduced, thereby enabling good film formation.

Therefore, by taking advantage of such superior properties, the resin film according to the present invention may be used as a substrate film of an electroconductive film. This electroconductive film is a film having a multilayer structure including the resin film according to the present invention and an electroconductive layer directly or indirectly disposed on the resin film. Since the resin film is usually excellent in adhesion to an electroconductive layer, the electroconductive layer may be provided directly on the surface of the resin film, but it may be provided via an underlayer such as a planarization layer if necessary.

Examples of the material of the electroconductive layer may include metal such as silver and copper; electroconductive inorganic materials such as ITO (indium tin oxide), IZO (indium zinc oxide), ZnO (zinc oxide), IWO (indium tungsten oxide), ITiO (indium titanium oxide), AZO (aluminum zinc oxide), GZO (gallium zinc oxide), XZO (zinc-based special oxide), and IGZO (indium gallium zinc oxide); and organic electroconductive materials such as a polythiophene compound.

The thickness of the electroconductive layer is preferably 30 nm or more, and more preferably 50 nm or more, and is preferably 250 nm or less, and more preferably 220 nm or less.

When the electroconductive layer is formed, a function as an electrode can be imparted to the obtained electroconductive film. The surface resistivity of the surface of the electroconductive film on the side of the electroconductive layer may be appropriately selected depending on the intended use, and is usually 1000 $\Omega$/sq. or less, and preferably 100 $\Omega$/sq. or less. The lower limit thereof is not particularly limited, but may be set to, for example, 0.1 $\Omega$/sq. or more.

The method for forming the electroconductive layer is not limited. For example, an electroconductive layer may be formed by applying a composition containing a metal nanowire or a polythiophene compound. Further, for example, an electroconductive layer that has been prepared separately from a substrate film may be bonded to a resin film serving as a substrate film to form the electroconductive layer on the surface of the resin film.

Further, for example, an electroconductive layer may be formed by forming a film of an electroconductive material on the surface of the resin film by a film forming method such as a vapor deposition method, a sputtering method, an ion plating method, an ion beam assisted vapor deposition method, an arc discharge plasma deposition method, a thermal CVD method, a plasma CVD method, a plating method, and a combination of these.

Among these, a vapor deposition method and a sputtering method are preferable, and a sputtering method is particularly preferable. By the sputtering method, an electroconductive layer having a uniform thickness can be formed, and it is possible to thereby prevent generation of locally thin portions in the electroconductive layer. Consequently, an increase in resistance due to the thin portion can be suppressed. Accoringly, when the electroconductive film is used for, for example, a capacitive touch sensor, detection sensitivity of the change in the electrostatic capacity can be enhanced.

Since the resin film according to the present invention has excellent size stability and heat resistance in a high temperature environment, film formation can be performed with high output, so that it is possible to rapidly form a flat electroconductive layer having excellent electroconductivity.

Before the electroconductive layer is formed on the surface of the resin film, the surface of the resin film may be subjected to a surface treatment. Examples of the surface treatment may include a corona treatment, a plasma treatment, and a chemical treatment. By performing the surface treatment, the binding property between the resin film and the electroconductive layer can be enhanced.

Further, the method for forming the electroconductive layer may include forming the electroconductive layer into a desired pattern shape by, for example, a film removal method such as an etching method.

In addition, the above-described electroconductive film may include an optional layer such as an optical functional layer or a barrier layer in combination with the resin film and the electroconductive layer.

[4. Barrier Film]

As described above, the resin film according to the present invention is excellent in bend resistance. Therefore, when a film forming step including a high-temperature process such as the step of forming an inorganic layer is performed, the stress difference generated between the resin film and the barrier layer can be reduced, thereby enabling favorable film formation.

Therefore, by taking advantage of such superior properties, the resin film according to the present invention may be used as a substrate film of a barrier film. This barrier film is a film having a multilayer structure including the resin film according to the present invention and a barrier layer directly or indirectly disposed on the resin film. Since the resin film is usually excellent in adhesion to the barrier layer, the barrier layer may be provided directly on the surface of the resin film, but it may be provided via an underlayer such as a planarization layer if necessary.

Examples of the material of the barrier layer used may include inorganic materials. Examples of such inorganic materials may include a metal oxide, a metal nitride, a metal oxynitride, and a material containing a mixture thereof. Examples of the metal constituting the metal oxide, the metal nitride, and the metal oxynitride may include silicon and aluminum, and silicon is particularly preferable. More specifically, examples of compositions of the metal oxide, the metal nitride, and the metal oxynitride may include compositions represented by $SiO_x$ ($1.5<x<1.9$), $SiN_y$ ($1.2<y<1.5$), and $SiO_xN_y$ ($1<x<2$ and $0<y<1$). When such a material is used, a barrier film excellent in transparency and barrier properties can be obtained.

The thickness of the barrier layer is preferably 3 nm or more, and more preferably 10 nm or more, and is preferably 2000 nm or less, and more preferably 1000 nm or less.

The upper limit of the moisture vapor transmission rate of the barrier layer is preferably 0.1 $g/m^2 \cdot day$ or less, and more preferably 0.01 $g/m^2 \cdot day$ or less.

The barrier film may be produced by a production method including a step of forming a barrier layer on the resin film according to the present invention. The method for forming the barrier layer is not particularly limited, and the barrier layer may be formed by a film forming method such as a vapor deposition method, a sputtering method, an ion plating method, an ion beam assisted vapor deposition method, an arc discharge plasma deposition method, a thermal CVD method, and a plasma CVD. In the arc discharge plasma method, vaporized particles having an appropriate energy are generated, so that a high-density barrier layer can be formed. In addition, by simultaneously vapor-depositing or sputtering a plurality of types of components, it is possible to form a barrier layer containing these plural components. The barrier layer may also be formed by applying a polysilazane-based compound onto the resin film according to the present invention, drying the same, and then converting the polysilazane-based compound to silica glass.

Figure 7:
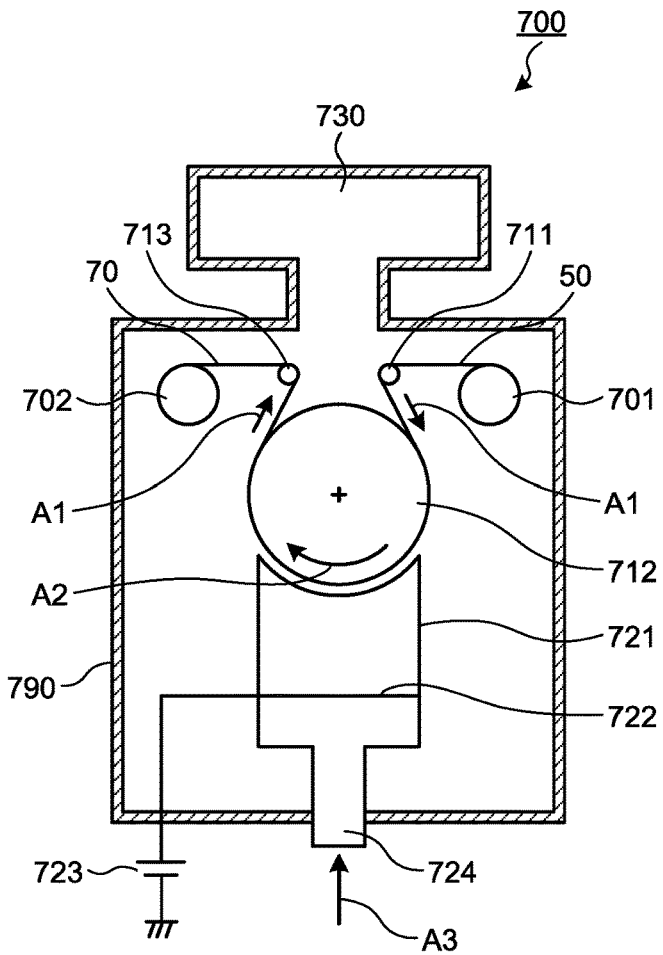
FIG. 7 is a cross-sectional view schematically illustrating an example of a film forming apparatus in which a barrier layer can be formed as an inorganic layer by a CVD method.

Specific examples of the method for producing the barrier layer described above will be described with reference to an example of an apparatus that performs the method. FIG. 7 is a cross-sectional view schematically illustrating an example of a film forming apparatus in which a barrier layer can be formed as an inorganic layer by a CVD method.

As illustrated in FIG. 7, a film forming apparatus 700 is a plasma CVD apparatus of a film-winding type. The film forming apparatus 700 performs a series of operations including continuously forming a barrier layer by a CVD method on a long-length resin film 50 having been unwound from a roll body 701 of the resin film 50 to form a barrier film 70, and winding the barrier film 70 as a roll body 702.

The film forming apparatus 700 includes a guide roll 711, a can roll 712, and a guide roll 713. These rolls can guide the unwound resin film 50 in a direction indicated by an arrow A1 to subject the resin film 50 to production steps. The positions of the guide roll 711, the can roll 712, and the guide roll 713 and tensions to be applied to the resin film 50 by these rolls are appropriately adjusted, so that the resin film 50 is kept in close contact with the can roll 712 during the guiding by the can roll 712.

The can roll 712 rotates in a direction indicated by an arrow A2, and the resin film 50 on the can roll 712 is conveyed while the resin film 50 is positioned in the proximity of a reaction tube 721. At that time, electricity is applied to an electrode 722 from a power supply 723 while the can roll 712 is grounded by an appropriate ground device (not illustrated), and a material gas for the barrier layer is introduced from a gas inlet 724 in a direction of an arrow A3. By these operations, the barrier layer can be continuously formed on the surface of the resin film 50. The series of operations are performed in a space surrounded by a vacuum chamber 790. The pressure inside the vacuum chamber 790 may be reduced by operating a vacuum evacuation device 730 to be adjusted at a pressure suitable for the CVD method.

In the case of performing such a process with high output power, if the resin film 50 is inferior in size stability in a high-temperature environment, floating of the resin film 50 from the can roll 212 or deformation of the resin film 50 is likely to occur. This may prevent continuous formation of a favorable barrier layer. However, since the resin film 50 according to the present invention is excellent in size stability in a high-temperature environment, it has low tendency to cause the aforementioned floating. Therefore, when the resin film 50 according to the present invention is used, a flat and uniform barrier layer can be continuously formed, so that the barrier film 70 can be produced with high efficiency. Further, since the resin film 50 according to the present invention has excellent heat resistance, thermal damage to the resin film 50 can be suppressed. Therefore, the barrier film 70 having a low moisture vapor transmission rate can be easily produced.

In addition, the barrier film may include an optional layer in combination with the resin film and the barrier layer. Examples of such an optional layer may include an antistatic layer, a hard coat layer, and an antifouling layer. These optional layers may be provided by, for example, a method of applying a material of an optional layer onto the barrier layer and curing the same, and a method of effecting adhesion of an optional layer thereto by means of thermocompression bonding.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operations described below were performed under the conditions of normal temperature and normal pressure, unless otherwise specified. In the following description, "sccm" is a unit of flow rate of a gas by which the amount of the gas flowing per minute is represented as the volume ($cm^3$) of the gas at 25° C. and 1 atm. The term "test piece" refers to a film having a specific size that has been cut out from the resin film, electroconductive film, or barrier film according to Example or Comparative Example that will be described later.

[Evaluation Method]
[Method for Measuring Thickness]
The thickness (μm) of the test piece resin film was measured using a contact-type web thickness meter (manufactured by Maysun Corporation, trade name "RC-101").
[Method for Measuring Thickness Variation Tv]
The thickness variation Tv (%) of the test piece resin film was determined by the following formula (14).

$$Tv\ [\%]=[(Tmax-Tmin)/Tave]\times 100 \tag{14}$$

In the formula (14),
Tmax is the maximum value of the thickness of the test piece resin film,
Tmin is the minimum value of the thickness of the test piece resin film, and
Tave is the average value of the thicknesses of the test piece resin film.

That is, the thickness variation Tv of the test piece resin film represents a percentage (%) determined by dividing the absolute value of a difference between the maximum value Tmax and the minimum value Tmin of thicknesses of the resin film by the average value Tave of thicknesses of the resin film, the maximum value Tmax, the minimum value Tmin, and the average value Tave being determined by measuring the thicknesses of the resin film at a plurality of positions.

Herein, the maximum value Tmax, the minimum value Tmin, and the average value Tave of thicknesses of the test piece resin film were determined in the following manner.

Out of the four edges of the test piece resin film, a pair of two edges opposing to each other was defined as A, and another pair of two edges orthogonal to the edges A was defined as B. Three straight lines parallel to the edges A were drawn on the film surface. The three straight lines were as follows: one was away from one of the edges A by a distance of 1/20 of the length of the edge B; another one passed through midpoints of the edges B; and the remaining one was away from the other edge A by a distance of 1/20 of the length of the edge B. On each of the straight lines, a point away from one of the edges B by a distance of 1/20 of the length of the edge A was set as a thickness measurement start point, a point away from the other edge B by a distance of 1/20 of the length of the edge A was set as a thickness measurement end point, and 10 measurement points were set so as to be apart with equal intervals. The thickness was measured at each of the measurement points.

Among thicknesses measured at a total of 30 measurement points, the maximum value was defined as the maximum value Tmax of the thickness of the test piece resin film, and the minimum value was defined as the minimum value Tmin of the thickness of the test piece resin film. The average value of the thicknesses was defined as the average Tave of the thicknesses of the test piece resin film.

[Method for Measuring Crystallization Degree]

The crystallization degree (%) of a polymer was measured by an X-ray diffraction method.

[Internal Haze]

The internal haze of the test piece resin film was measured in the following manner. First, as the test piece resin film, a cutout film having a size of 50 mm×50 mm was prepared. Then, a cycloolefin film (ZEONOR Film "ZF14-040" manufactured by ZEON Corporation, thickness: 40 μm) was bonded to each of both the surfaces of the test piece resin film with a 50 μm-thick transparent optical tackiness film (manufactured by 3M, 8146-2) interposed between the resin film and the cycloolefin film. Then, the haze of the test piece resin film with the cycloolefin films bonded thereto was measured using a haze meter ("NDH5000" manufactured by Nippon Denshoku Industries Co., Ltd.). From the haze value thus measured, 0.04 that was the sum of the haze values of the two cycloolefin films and the haze values of the two transparent optical tackiness film layers was subtracted, and the resulting value was adopted as the internal haze of the test piece resin film.

Herein, in order to determine the sum of the haze values of the two cycloolefin films and the haze values of the two transparent optical tackiness film layers, a stacked body was formed by stacking the cycloolefin film, the transparent optical tackiness film, the transparent optical tackiness film, and the cycloolefin film in this order. Then, the haze value of this stacked body was measured, and the measured value was adopted as the sum of the haze values of the two cycloolefin films and the haze values of the two transparent optical tackiness film layers.

[Method for Measuring Number of Bending Cycles to Fracture]

The number of bending cycles to fracture (×1000) was measured in the following manner to evaluate the bend resistance of the test piece resin film. Specifically, first, as the test piece resin film, a cutout film having a width of 50 mm and a length of 100 mm was prepared. Then, the number of bending cycles to fracture of the test piece resin film was measured by a tension-free U-shape folding test method using a desktop model endurance test machine "DLDMLH-FS" manufactured by Yuasa System Co., Ltd. The folding test was performed under conditions of a bend radius of the test piece resin film of 1 mm and a folding speed of 80 cycles/min. Herein, the folding test was performed by folding the resin film from an almost flat state to a state where a curved portion having a radius of 1 mm was formed and then again returning the folded resin film to an almost flat state, and this sequence was counted as one bending cycle. The test piece resin film was repeatedly folded. The test machine was once stopped every 1000 cycles until the number of bending cycles reached 10000 cycles, every 5000 cycles after the number of bending cycles exceeded 10000 cycles and until the number of bending cycles reached 50000 cycles, and every 10000 cycles after the number of bending cycles exceeded 50000 cycles in order to visually observe the test piece resin film to determine whether or not even slight cracking occurred. The number of bending cycles at which cracking occurred was adopted as the "number of bending cycles to fracture". The number of bending cycles to fracture was measured for 5 test piece resin films (N=5). Among the numbers of bending cycles to fracture measured for the 5 test piece resin films, the smallest number of bending cycles to fracture was used for evaluation of the bend resistance.

Herein, the larger number of bending cycles to fracture means that the resin film is superior in bend resistance. When the number of bending cycles to fracture is 100×1000 (100000) or more, the resin film is evaluated as having sufficiently excellent bend resistance, and when the number of bending cycles to fracture exceeds 200×1000 (200000), the resin film is evaluated as having particularly excellent bend resistance.

[Method for Measuring Hydrogenation Ratio of Polymer]

The hydrogenation ratio of the polymer was measured by $^1$H-NMR at 145° C. using orthodichlorobenzene-$d^4$ as a solvent.

[Method for Measuring Weight-Average Molecular Weight (Mw) and Number-Average Molecular Weight (Mn)]

The weight-average molecular weight (Mw) and the number-average molecular weight (Mn) of the polymer were measured as a polystyrene-equivalent value by a gel permeation chromatography (GPC) system ("HLC-8320" manufactured by Tosoh Corporation). In the measurement, an H-type column (manufactured by Tosoh Corporation) was used as a column, and tetrahydrofuran was used as a solvent. The measurement was performed at a temperature of 40° C.

[Method for Measuring Racemo Diad Ratio of Polymer]

The racemo diad ratio of the polymer was measured in the following manner. The $^{13}$C-NMR measurement of the polymer was performed at 200° C. with ortho-dichlorobenzene-$d^4$ as a solvent by an inverse-gated decoupling method. From the result of this 13C-NMR measurement, a signal at 43.35 ppm derived from the meso diad and a signal at 43.43 ppm derived from the racemo diad were identified with the peak at 127.5 ppm of ortho-dichlorobenzene-$d^4$ as a reference shift. On the basis of the intensity ratio of these signals, the ratio of the racemo diad of the polymer was determined.

[Method for Measuring Glass Transition Temperature Tg, Melting Point Tm, and Crystallization Peak Temperature Tpc]

The glass transition temperature Tg and the melting point Tm of the polymer were measured in the following manner. First, the polymer was melted by heating, and the melted polymer was rapidly cooled with dry ice to obtain an amorphous polymer. Then, the amorphous polymer was used as a sample to measure the glass transition temperature Tg, the melting point Tm, and the crystallization peak temperature Tpc of the polymer with the use of a differential scanning calorimeter (DSC) at a temperature rise rate of 10° C./min (temperature rise mode).

[Method for Measuring Amount of Film Deformation]

The amount of film deformation (μm) was measured in the following manner to evaluate the bend resistance of the test piece electroconductive film.

First, as the test piece electroconductive film, a cutout film having a size of 50 mm×50 mm was prepared. Then, the electroconductive film was placed on a flat stage with its resin film side facing upward. A glass plate having a thickness of 100 μm and a size of 50 mm×50 mm was placed on the electroconductive film so that their four corners were matched. In such a state, the height from the upper surface of the stage to the upper surface of the glass plate was measured at the four corners of the glass plate with the use of an ultra-deep microscope ("VK-9500" manufactured by Keyence Corporation). From the measured values thus obtained, the amount of film deformation of the electroconductive film was calculated using the following formula.

Amount of film deformation (μm)=Average of measured values of height at four corners–average thickness of resin film–thickness of glass plate Further, the amount of film deformation of the test piece barrier film was also measured in the same manner as described above to evaluate the bend resistance of the barrier film test piece.

Herein, the larger amount of film deformation means that the difference in internal stress between the resin film and an electroconductive layer or a barrier layer stacked on the resin film is larger due to larger deformation variation caused in the resin film used for preparing the test piece electroconductive film or the test piece barrier film. In this case, the test piece electroconductive film or the test piece barrier film is evaluated as not having sufficiently excellent bend resistance.

Production Example 1. Production of Hydrogenated Product of Ring-Opening Polymer of Dicyclopentadiene As a polymer capable of forming a resin film, a hydrogenated product of a ring-opening polymer of dicyclopentadiene was produced in the following manner.

A metal pressure-resistant reaction vessel was sufficiently dried and inside air thereof was replaced with nitrogen. In the metal pressure-resistant reaction vessel, 154.5 parts of cyclohexane, 42.8 parts of a cyclohexane solution of dicyclopentadiene (endo isomer content: 99% or higher) with a concentration of 70% (amount of dicyclopentadiene: 30 parts), and 1.8 parts of 1-hexene were placed and heated to 53° C.

0.061 part of an n-hexane solution of diethylaluminum ethoxide with a concentration of 19% was added to a solution that had been prepared by dissolving 0.014 part of a tetrachlorotungsten phenylimide (tetrahydrofuran) complex in 0.70 part of toluene, and the mixture was stirred for 10 minutes to prepare a catalyst solution.

The catalyst solution was added to the pressure-resistant reaction vessel to initiate a ring-opening polymerization reaction. Then, the reaction was performed for 4 hours while the temperature was maintained at 53° C. to obtain a solution of a ring-opening polymer of dicyclopentadiene.

The obtained ring-opening polymer of dicyclopentadiene had a number-average molecular weight (Mn) of 8,830 and a weight-average molecular weight (Mw) of 29,800, and a molecular weight distribution (Mw/Mn) determined from them was 3.37.

Then, 0.037 part of 1,2-ethanediol was added to 200 parts of the obtained solution of the ring-opening polymer of dicyclopentadiene, and the mixture was heated to 60° C. and stirred for 1 hour to terminate the polymerization reaction. Then, 1 part of a hydrotalcite-like compound ("KYOWAAD (registered trademark) 2000" manufactured by Kyowa Chemical Industry Co., Ltd.) was added to the mixture, and the mixture was heated to 60° C. and stirred for 1 hour. Then, 0.4 part of a filtration aid ("Radiolite (registered trademark) #1500" manufactured by Showa Chemical Industry Co., Ltd.) was added, and the mixture was filtered through a PP pleated cartridge filter ("TCP-HX" manufactured by Advantec Toyo Kaisha, Ltd.) to separate the adsorbent and the solution.

Then, 100 parts of cyclohexane was added to 200 parts of the filtered solution of the ring-opening polymer of dicyclopentadiene (amount of polymer: 30 parts), and 0.0043 part of chlorohydridecarbonyl tris(triphenylphosphine) ruthenium was added to perform a hydrogenation reaction at a hydrogen pressure of 6 MPa and 180° C. for 4 hours. As a result, a reaction solution containing a hydrogenated product of the ring-opening polymer of dicyclopentadiene was obtained. This reaction solution was a slurry solution in which the hydrogenated product was precipitated.

The hydrogenated product contained in the reaction solution was separated from the solution by a centrifugal separator and dried under reduced pressure at 60° C. for 24 hours to obtain 28.5 parts of the hydrogenated product of the ring-opening polymer of dicyclopentadiene having crystallizability. The hydrogenation ratio of the hydrogenated product was found to be 99% or higher, the glass transition temperature Tg was 97° C., the melting point Tm was 266° C., the crystallization peak temperature Tpc was 136° C., and the racemo diad ratio was 89%.

[Production Example 2A. Production of 50 μm-Thick First Film]

A first film that is a resin film before being subjected to a stretching treatment was produced in the following manner.

100 parts of the hydrogenated product of the ring-opening polymer of dicyclopentadiene obtained in Production Example 1 was mixed with 1.1 parts of an antioxidant (tetrakis[methylene-3-(3',5'-di-t-butyl-4'-hydroxyphenyl) propionate]methane; "Irganox (registered trademark) 1010" manufactured by BASF Japan Ltd.) to obtain a crystallizable resin as a material of the resin film.

The crystallizable resin was charged into a twin-screw extruder ("TEM-37B" manufactured by Toshiba Machine Co., Ltd.) having four die holes each having an inner diameter of 3 mmϕ. The resin was molded by hot-melt extrusion molding using the twin-screw extruder to obtain a molded body in a strand shape. The molded body was finely cut with a strand cutter to obtain resin pellets. The twin-screw extruder was operated under the following conditions.

Barrel preset temperature: 270° C. to 280° C.
Die preset temperature: 250° C.
Screw rotation speed: 145 rpm
Feeder rotation speed: 50 rpm Subsequently, the obtained resin pellets were fed into a hot-melt extrusion film molding machine equipped with a T die. As the operation conditions for the film molding machine, a barrel temperature of 280° C. to 290° C., a die temperature of 270° C., and a screw rotation speed of 30 rpm were set. The melted resin obtained by melting the resin pellets was extruded from the film forming machine into a film shape having a width of 500 mm onto the surface of a rotating cast roll (casting). The rotation speed of the cast roll was set to 6 m/min. Then, the extruded melted resin was cooled on the roll to thereby be molded in a long-length film shape. In this manner, a first film was obtained. The obtained first film had a thickness of 50 μm.

Production Example 2B. Production of 25 μm-Thick First Film

The film molding machine was operated in the same manner as the production of the first film in Production Example 2A except that the rotation speed of the cast roll was changed to 12 m/min. The first film thus obtained had a thickness of 25 μm.

[Example 1]

[1-1. Pre-Heating Step]

The 50 μm-thick first film obtained in Production Example 2A was cut out at randomly selected regions to have necessary number of square pieces of 350 mm×350 mm. The cutting was performed such that a pair of two edges of the cut-out square 50 μm-thick first film were parallel to the MD direction of the long-length first film. Then, the cut-out 50 μm-thick first film was set in a compact stretching machine ("EX10-B type" manufactured by Toyo Seiki Seisaku-sho, Ltd.). The compact stretching machine is equipped with a plurality of clips that can grip the four edges of the film, and is configured to be capable of stretching the film by moving the clips. Using the compact stretching machine, the four edges of the 50 μm-thick first film were held. Keeping this state, the 50 μm-thick first film was pre-heated at a pre-heating temperature of Tph for a pre-heating time $t_p$, with the use of an oven (pre-heating zone) without changing the distance between the clips. The pre-heating temperature Tph was set to 120° C., and the pre-heating time $t_{ph}$ was set to 80 seconds. In this manner, a second film was obtained as the pre-heated first film.

[1-2. Stretching Step]

The second film obtained in [1-1] was immediately stretched in the TD direction by gradually increasing the distance between the clips (at this time, the stretching ratio exceeded 1) in a state where the second film was still placed in the oven (stretching zone) of the compact stretching machine. The increase in the distance between the clips was stopped at the time point when the stretching ratio of the film reached a predetermined value. At this time, the speed of stretching was set to 1000 mm/min. The stretching ratio was set to 2.5 times. The stretching temperature Tst was set to 120° C. In this manner, a third film was obtained as the stretched second film. The average thickness of the obtained third film was determined and found to be 20 μm.

[1-3. Thermal Setting Step]

While keeping the state that the four edges of the third film obtained in [1-2] were still held by the clips of the compact stretching machine, the third film was subjected to a thermal setting treatment using a pair of secondary heating plates that are equipment of the compact stretching machine, the treatment being performed by bringing the plates in the vicinity of both surfaces of the third film. Each of the secondary heating plates had a size of 300 mm×300 mm. The positions of the pair of heating plates were adjusted such that the distance between the third film and the upper or lower heating plate was 8 mm. By this operation, the third film was kept in a heated state at a thermal setting temperature Tts for 30 seconds in a thermal setting zone defined by the pair of heating plates. In this manner, the crystallization step was performed at a thermal setting temperature Tts for a thermal setting time $t_{ts}$ to promote crystallization of the polymer contained in the third film to obtain a fourth film as the third film having been subjected to a crystallization treatment. The thermal setting temperature Tts was set to 180° C. The thermal setting time $t_{ts}$ was set to 30 seconds.

The crystallization degree of the polymer contained in the obtained fourth film was measured and found to be 73%.

[1-4. Relaxation Step]

While keeping the state that the four edges of the fourth film were held, the distance between the clips in the TD direction and the distance between the clips in the MD direction were reduced at the same time by 3% and 1%, respectively, over 5 seconds at the same preset temperature as the thermal setting temperature Tts in the thermal setting step, and then the fourth film was maintained in such a state at the same temperature for 10 seconds. In this manner, a resin film according to Example 1 was obtained for cutting out therefrom test pieces.

The internal haze of the obtained resin film was measured and found to be 0.07%. The number of bending cycles to fracture of the resin film was measured and found to be 130×1000 (130000) cycles.

Example 2

In the above-described step [1-1. Pre-Heating Step], the pre-heating time $t_{ph}$ was set to 40 seconds and the pre-heating temperature Tph was set to 125° C., and in the above-described step [1-2. Stretching Step], the stretching temperature Tst was set to 125° C. The same operations as those in Example 1 were performed except for the aforementioned matters.

Example 3

In the above-described step [1-1. Pre-Heating Step], the pre-heating time $t_{ph}$ was set to 65 seconds. The same operations as those in Example 2 were performed except for the aforementioned matter.

Example 4

In the above-described step [1-1. Pre-Heating Step], the pre-heating temperature Tph was set to 130° C. and the pre-heating time $t_{ph}$ was set to 30 seconds, and in the above-described step [1-2. Stretching Step], the stretching temperature Tst was set to 130° C. The same operations as those in Example 1 were performed except for the aforementioned matters.

Example 5

In the above-described step [1-1. Pre-Heating Step], the pre-heating time $t_{ph}$ was set to 40 seconds. The same operations as those in Example 4 were performed except for the aforementioned matter.

Example 6

In the above-described step [1-1. Pre-Heating Step], the pre-heating time $t_{ph}$ was set to 50 seconds. The same operations as those in Example 4 were performed except for the aforementioned matter.

Example 7

In the above-described step [1-3. Thermal Setting Step], the thermal setting temperature Tts was set to 155° C. The same operations as those in Example 4 were performed except for the aforementioned matter.

Example 8

In the above-described step [1-3. Thermal Setting Step], the thermal setting temperature Tts was set to 235° C. The same operations as those in Example 4 were performed except for the aforementioned matter.

Example 9

In the above-described step [1-3. Thermal Setting Step], the thermal setting temperature Tts was set to 250° C. The same operations as those in Example 4 were performed except for the aforementioned matter.

Example 10

In the above-described step [1-1. Pre-Heating Step], the pre-heating temperature Tph was set to 135° C. and the pre-heating time $t_{ph}$ was set to 20 seconds, and in the above-described step [1-2. Stretching Step], the stretching temperature Tst was set to 135° C. The same operations as those in Example 1 were performed except for the aforementioned matters.

Example 11

In the above-described step [1-1. Pre-Heating Step], the pre-heating time $t_{ph}$ was set to 30 seconds. The same operations as those in Example 10 were performed except for the aforementioned matter.

Example 12

In the above-described step [1-1. Pre-Heating Step], the pre-heating time $t_{ph}$ was set to 40 seconds. The same operations as those in Example 10 were performed except for the aforementioned matter.

Example 13

In the above-described step [1-1. Pre-Heating Step], the pre-heating temperature Tph was set to 140° C. and the pre-heating time $t_{ph}$ was set to 10 seconds, and in the above-described step [1-2. Stretching Step], the stretching temperature Tst was set to 140° C. The same operations as those in Example 1 were performed except for the aforementioned matters.

Example 14

In the above-described step [1-1. Pre-Heating Step], the pre-heating time $t_{ph}$ was set to 30 seconds. The same operations as those in Example 13 were performed except for the aforementioned matter.

Example 15

In the above-described step [1-1. Pre-Heating Step], the pre-heating temperature Tph was set to 145° C. and the pre-heating time $t_{ph}$ was set to 15 seconds, and in the above-described step [1-2. Stretching Step], the stretching temperature Tst was set to 145° C. The same operations as those in Example 1 were performed except for the aforementioned matters.

Example 16

In the above-described step [1-1. Pre-Heating Step], the first film with a thickness of 25 µm obtained in Production Example 2B was used, the pre-heating temperature Tph was set to 130° C. and the pre-heating time $t_{ph}$ was set to 30 seconds, and in the above-described step [1-2. Stretching Step], the stretching temperature Tst was set to 130° C. and the stretching ratio was set to 1.25 times. The same operations as those in Example 1 were performed except for the aforementioned matters.

Example 17

In the above-described step [1-1. Pre-Heating Step], the pre-heating time $t_{ph}$ was set to 50 seconds. The same operations as those in Example 16 were performed except for the aforementioned matter.

Comparative Example 1

In the above-described step [1-1. Pre-Heating Step], the pre-heating temperature Tph was set to 110° C. and the pre-heating time $t_{ph}$ was set to 100 seconds, and in the above-described step [1-2. Stretching Step], the stretching temperature Tst was set to 110° C. The same operations as those in Example 1 were performed except for the aforementioned matters.

Comparative Example 2

In the above-described step [1-1. Pre-Heating Step], the pre-heating temperature Tph was set to 115° C. and the pre-heating time $t_{ph}$ was set to 60 seconds, and in the above-described step [1-2. Stretching Step], the stretching temperature Tst was set to 115° C. The same operations as those in Example 1 were performed except for the aforementioned matters.

Comparative Example 3

In the above-described step [1-1. Pre-Heating Step], the pre-heating time $t_{ph}$ was set to 105 seconds. The same operations as those in Comparative Example 2 were performed except for the aforementioned matter.

Comparative Example 4

In the above-described step [1-1. Pre-Heating Step], the pre-heating time $t_{ph}$ was set to 95 seconds. The same operations as those in Example 1 were performed except for the aforementioned matter.

Comparative Example 5

In the above-described step [1-1. Pre-Heating Step], the pre-heating temperature Tph was set to 125° C., and in the above-described step [1-2. Stretching Step], the stretching temperature Tst was set to 125° C. The same operations as those in Example 1 were performed except for the aforementioned matters.

Comparative Example 6

In the above-described step [1-1. Pre-Heating Step], the pre-heating temperature Tph was set to 130° C. and the preheating time $t_{ph}$ was set to 70 seconds, and in the above-described step [1-2. Stretching Step], the stretching temperature Tst was set to 130° C. The same operations as those in Example 1 were performed except for the aforementioned matters.

Comparative Example 7

In the above-described step [1-1. Pre-Heating Step], the pre-heating temperature Tph was set to 130° C. and the preheating time $t_{ph}$ was set to 30 seconds, in the above-described step [1-2. Stretching Step], the stretching temperature Tst was set to 130° C., and in the above-described step [1-3. Thermal Setting Step], the thermal setting temperature Tts was set to 140° C. The same operations as those in Example 1 were performed except for the aforementioned matters.

Comparative Example 8

In the above-described step [1-1. Pre-Heating Step], the pre-heating temperature Tph was set to 135° C. and the pre-heating time $t_{ph}$ was set to 55 seconds, and in the above-described step [1-2. Stretching Step], the stretching temperature Tst was set to 135° C. The same operations as those in Example 1 were performed except for the aforementioned matters.

Comparative Example 9

In the above-described step [1-1. Pre-Heating Step], the pre-heating temperature Tph was set to 140° C. and the pre-heating time $t_{ph}$ was set to 45 seconds, and in the above-described step [1-2. Stretching Step], the stretching temperature Tst was set to 140° C. The same operations as those in Example 1 were performed except for the aforementioned matters.

Comparative Example 10

In the above-described step [1-1. Pre-Heating Step], the pre-heating temperature Tph was set to 145° C. and the pre-heating time $t_{ph}$ was set to 30 seconds, and in the above-described step [1-2. Stretching Step], the stretching temperature Tst was set to 145° C. The same operations as those in Example 1 were performed except for the aforementioned matters.

Comparative Example 11

In the above-described step [1-1. Pre-Heating Step], the pre-heating temperature Tph was set to 150° C. and the pre-heating time $t_{ph}$ was set to 5 seconds, and in the above-described step [1-2. Stretching Step], the stretching temperature Tst was set to 150° C. The same operations as those in Example 1 were performed except for the aforementioned matters.

Comparative Example 12

In the above-described step [1-1. Pre-Heating Step], the pre-heating temperature Tph was set to 155° C., and in the above-described subsequent step [1-2. Stretching Step], the stretching temperature Tst was set to 155° C. In the above-described step [1-1. Pre-Heating Step], the pre-heating time $t_{ph}$ was substantially zero seconds. The same operations as those in Example 1 were performed except for the aforementioned matters.

Comparative Example 13

In the above-described step [1-1. Pre-Heating Step], the first film with a thickness of 25 μm obtained in Production Example 2B was used, the pre-heating temperature Tph was set to 110° C. and the pre-heating time $t_{ph}$ was set to 100 seconds, and in the above-described step [1-2. Stretching Step], the stretching temperature Tst was set to 110° C. and the stretching ratio was set to 1.25 times. The same operations as those in Example 1 were performed except for the aforementioned matters.

Comparative Example 14

In the above-described step [1-1. Pre-Heating Step], the pre-heating temperature Tph was set to 130° C. and the pre-heating time $t_{ph}$ was set to 70 seconds, and in the above-described step [1-2. Stretching Step], the stretching temperature Tst was set to 130° C. The same operations as those in Comparative Example 13 were performed except for the aforementioned matters.

Comparative Example 15

In the above-described step [1-1. Pre-Heating Step], the pre-heating temperature Tph was set to 155° C., and in the above-described subsequent step [1-2. Stretching Step], the stretching temperature Tst was set to 155° C. In the above-described step [1-1. Pre-Heating Step], the pre-heating time $t_{ph}$ was substantially zero seconds. The same operations as those in Comparative Example 13 were performed except for the aforementioned matters.

[Results]

The production conditions of the above-described Examples 1 to 17 are shown in Table 1, and the evaluation results thereof are shown in Table 2. The production conditions of the above-described Comparative Examples 1 to 15 are shown in Table 3, and the evaluation results thereof are shown in Table 4. In the following Tables 1 to 4, the meanings of abbreviations are as follows. In Tables 1 and 3, the average value of the thickness indicates the average value of the thickness of the first film. In Tables 2 and 4, the average value of the thickness indicates the average value of the thickness of the resin film.

"Tph": pre-heating temperature

"$t_{ph}$": pre-heating time

"Tst": stretching temperature

"Tts": thermal setting temperature

"$t_{ts}$": thermal setting time

"Tv": thickness variation

TABLE 1

[Examples 1-17 (Production conditions)]

| | Average thickness value (μm) | Tph (° C.) | $t_{ph}$ (seconds) | Tst (° C.) | Stretching ratio (times) | Tts (° C.) | $t_{ts}$ (seconds) |
|---|---|---|---|---|---|---|---|
| Ex. 1 | 50 | 120 | 80 | 120 | 2.5 | 180 | 30 |
| Ex. 2 | 50 | 125 | 40 | 125 | 2.5 | 180 | 30 |
| Ex. 3 | 50 | 125 | 65 | 125 | 2.5 | 180 | 30 |
| Ex. 4 | 50 | 130 | 30 | 130 | 2.5 | 180 | 30 |
| Ex. 5 | 50 | 130 | 40 | 130 | 2.5 | 180 | 30 |
| Ex. 6 | 50 | 130 | 50 | 130 | 2.5 | 180 | 30 |
| Ex. 7 | 50 | 130 | 30 | 130 | 2.5 | 155 | 30 |
| Ex. 8 | 50 | 130 | 30 | 130 | 2.5 | 235 | 30 |
| Ex. 9 | 50 | 130 | 30 | 130 | 2.5 | 250 | 30 |
| Ex. 10 | 50 | 135 | 20 | 135 | 2.5 | 180 | 30 |
| Ex. 11 | 50 | 135 | 30 | 135 | 2.5 | 180 | 30 |
| Ex. 12 | 50 | 135 | 40 | 135 | 2.5 | 180 | 30 |
| Ex. 13 | 50 | 140 | 10 | 140 | 2.5 | 180 | 30 |
| Ex. 14 | 50 | 140 | 30 | 140 | 2.5 | 180 | 30 |
| Ex. 15 | 50 | 145 | 15 | 145 | 2.5 | 180 | 30 |
| Ex. 16 | 25 | 130 | 30 | 130 | 1.25 | 180 | 30 |
| Ex. 17 | 25 | 130 | 50 | 130 | 1.25 | 180 | 30 |

TABLE 2

Example 1-17 (Evaluation results)

| | Average thickness value (μm) | Tv (%) | Crystallization degree (%) | Internal haze (%) | Bending cycles to fracture (x1000) |
|---|---|---|---|---|---|
| Ex. 1 | 20 | 4.70 | 73 | 0.07 | 130 |
| Ex. 2 | 20 | 2.20 | 68 | 0.06 | 150 |
| Ex. 3 | 20 | 1.90 | 71 | 0.15 | 180 |
| Ex. 4 | 20 | 0.89 | 72 | 0.05 or less | More than 200 |
| Ex. 5 | 20 | 1.30 | 72 | 0.09 | More than 200 |
| Ex. 6 | 20 | 2.60 | 70 | 0.36 | 170 |
| Ex. 7 | 20 | 0.90 | 52 | 0.05 or less | 120 |
| Ex. 8 | 20 | 0.93 | 73 | 2.70 | More than 200 |
| Ex. 9 | 20 | 1.00 | 75 | 4.80 | 150 |
| Ex. 10 | 20 | 0.87 | 70 | 0.05 or less | More than 200 |
| Ex. 11 | 20 | 1.30 | 69 | 0.10 | More than 200 |
| Ex. 12 | 20 | 2.60 | 73 | 0.35 | 150 |
| Ex. 13 | 20 | 1.20 | 68 | 0.10 | More than 200 |
| Ex. 14 | 20 | 1.20 | 71 | 0.23 | More than 200 |
| Ex. 15 | 20 | 1.40 | 70 | 0.95 | 190 |
| Ex. 16 | 20 | 1.20 | 74 | 0.09 | More than 200 |
| Ex. 17 | 20 | 2.90 | 70 | 0.42 | 180 |

TABLE 3

[Comparative Examples 1-15 (Production conditions)]

| | Average thickness value (μm) | Tph (° C.) | $t_{ph}$ (seconds) | Tst (° C.) | Stretching ratio (times) | Tts (° C.) | $t_{ts}$ (seconds) |
|---|---|---|---|---|---|---|---|
| Comp. Ex. 1 | 50 | 110 | 100 | 110 | 2.5 | 180 | 30 |
| Comp. Ex. 2 | 50 | 115 | 60 | 115 | 2.5 | 180 | 30 |
| Comp. Ex. 3 | 50 | 115 | 105 | 115 | 2.5 | 180 | 30 |
| Comp. Ex. 4 | 50 | 120 | 95 | 120 | 2.5 | 180 | 30 |
| Comp. Ex. 5 | 50 | 125 | 80 | 125 | 2.5 | 180 | 30 |
| Comp. Ex. 6 | 50 | 130 | 70 | 130 | 2.5 | 180 | 30 |
| Comp. Ex. 7 | 50 | 130 | 30 | 130 | 2.5 | 140 | 30 |
| Comp. Ex. 8 | 50 | 135 | 55 | 135 | 2.5 | 180 | 30 |
| Comp. Ex. 9 | 50 | 140 | 45 | 140 | 2.5 | 180 | 30 |
| Comp. Ex. 10 | 50 | 145 | 30 | 145 | 2.5 | 180 | 30 |
| Comp. Ex. 11 | 50 | 150 | 5 | 150 | 2.5 | 180 | 30 |
| Comp. Ex. 12 | 50 | 155 | 0 | 155 | 2.5 | 180 | 30 |
| Comp. Ex. 13 | 25 | 110 | 100 | 110 | 1.25 | 180 | 30 |
| Comp. Ex. 14 | 25 | 130 | 70 | 130 | 1.25 | 180 | 30 |
| Comp. Ex. 15 | 25 | 155 | 0 | 155 | 1.25 | 180 | 30 |

TABLE 4

Comparative Examples 1-15 (Evaluation results)

| | Average thickness value (μm) | Tv (%) | Crystallization degree (%) | Internal haze (%) | Benzding cycles to fracture (x1000) |
|---|---|---|---|---|---|
| Comp. Ex. 1 | 18 | 23.80 | 77 | 0.05 or less | 35 |
| Comp. Ex. 2 | 20 | 22.10 | 75 | 0.05 or less | 45 |
| Comp. Ex. 3 | 16 | 26.40 | 77 | 0.07 | 35 |
| Comp. Ex. 4 | 21 | 5.30 | 72 | 0.09 | 70 |
| Comp. Ex. 5 | 22 | 6.30 | 75 | 1.60 | 80 |
| Comp. Ex. 6 | 21 | 5.30 | 73 | 1.30 | 80 |
| Comp. Ex. 7 | 20 | 0.77 | 26 | 0.05 or less | 45 |
| Comp. Ex. 8 | 22 | 6.20 | 70 | 1.50 | 90 |
| Comp. Ex. 9 | 21 | 6.50 | 67 | 2.10 | 70 |
| Comp. Ex. 10 | 22 | 5.90 | 69 | 3.90 | 70 |
| Comp. Ex. 11 | 24 | 5.20 | 66 | 2.90 | 70 |
| Comp. Ex. 12 | 23 | 7.00 | 68 | 3.50 | 50 |
| Comp. Ex. 13 | 19 | 13.2 | 76 | 0.05 or less | 45 |
| Comp. Ex. 14 | 21 | 5.90 | 72 | 2.80 | 60 |
| Comp. Ex. 15 | 21 | 5.30 | 68 | 4.10 | 40 |

Examples 18 to 21 and Comparative Examples 16 to 19 will be described below. In these Examples and Comparative Examples, test piece electroconductive films and test piece barrier films were prepared from the obtained resin films in the following manner to measure the amount of film deformation (μm).

Example 18

[18-5. Step of Producing Electroconductive Film]

First, a film forming apparatus capable of forming an electroconductive layer on one surface of the resin film by sputtering was prepared. This film forming apparatus is a film wound-up-type magnetron sputtering apparatus capable of forming a desired electroconductive layer on a surface of the resin film fixed on a long-length carrier film continuously conveyed in the apparatus. As the carrier film, a polyethylene terephthalate film was used.

A part of the resin film of Example 4 was cut out to have necessary number of square pieces each having a size of 100 mm×100 mm. The cut-out resin film was fixed to the carrier film with a polyimide tape. Then, this carrier film was fed to the film forming apparatus to form an electroconductive layer on one surface of the resin film. In this operation, an $In_2O_3$—$SnO_2$ ceramic target was used as a target for sputtering. The film formation was performed under conditions of an argon (Ar) flow rate of 150 sccm, an oxygen ($O_2$) flow rate of 10 sccm, an output of 4.0 kW, a degree of vacuum of 0.3 Pa, and a film conveyance rate of 0.5 m/min.

As a result, a 100 nm-thick transparent electroconductive layer formed of ITO was formed on one surface of the resin film, so that an electroconductive film having the electroconductive layer and the resin film was obtained. The amount of film deformation of the test piece electroconductive film was 4 µm.

Example 19

In the above-described step [18-5. Step of Producing Electroconductive Film], a part of the resin film in Example 16 was used. The same operations as those in Example 18 were performed except for the aforementioned matter. The amount of film deformation of the test piece electroconductive film was 7 µm.

Comparative Example 16

In the above-described step [18-5. Step of Producing Electroconductive Film], a part of the resin film in Comparative Example 6 was used. The same operations as those in Example 18 were performed except for the aforementioned matter. The amount of film deformation of the test piece electroconductive film was 25 µm.

Comparative Example 17

In the above-described step [18-5. Step of Producing Electroconductive Film], a part of the resin film in Comparative Example 14 was used. The same operations as those in Example 18 were performed except for the aforementioned matter. The amount of film deformation of the test piece electroconductive film was 31 µm.

[Results]

The results of the aforementioned Examples 18 and 19 and Comparative Examples 16 and 17 are shown in Table 5.

TABLE 5

Film deformation amount of electroconductive film

|  | Film deformation amount (µm) |
|---|---|
| Ex. 18 | 4 |
| Ex. 19 | 7 |
| Comp. Ex. 16 | 25 |
| Comp. Ex. 17 | 31 |

Example 20

[20-6. Step of Producing Barrier Film]

First, a film forming apparatus capable of forming a barrier layer on one surface of the resin film by a CVD method was prepared. Similarly to the film forming apparatus illustrated in FIG. 7, this film forming apparatus is a film wound-up-type plasma CVD apparatus capable of forming a desired barrier layer on a surface of the film conveyed in the apparatus. However, the film forming apparatus used here is configured to form a barrier layer on the resin film fixed to a carrier film so as to be able to form the barrier layer on the resin film in a sheet piece shape. Specifically, the prepared film forming apparatus is configured to form a desired barrier layer on a surface of the resin film when the resin film is fixed on a long-length carrier film continuously conveyed in the apparatus. As the carrier film, a polyethylene terephthalate film was used.

A part of the resin film of Example 4 obtained in the above-described step [1-4. Relaxation step] was cut out to have necessary number of square pieces having a size of 100 mm×100 mm. The cut-out resin film was fixed to the carrier film with a polyimide tape. Then, this carrier film was fed to the film forming apparatus to form a barrier layer on one surface of the resin film. The film formation was performed by RF plasma discharge under conditions of a tetramethylsilane (TMS) flow rate of 10 sccm, an oxygen ($O_2$) flow rate of 100 sccm, an output of 0.8 kW, a total pressure of 5 Pa, and a film conveyance rate of 0.5 m/min.

As a result, a 300 nm-thick barrier layer formed of SiOx was formed on one surface of the resin film so that a barrier film having the barrier layer and the resin film was obtained. The amount of film deformation of the test piece barrier film was 3 µm.

Example 21

In the above-described step [18-5. Step of Producing Electroconductive Film], a part of the resin film in Example 16 was used. The same operations as those in Example 18 were performed except for the aforementioned matter. The amount of film deformation of the test piece electroconductive film was 4 µm.

Comparative Example 18

In the above-described step [18-5. Step of Producing Electroconductive Film], a part of the resin film in Comparative Example 6 was used. The same operations as those in Example 18 were performed except for the aforementioned matter. The amount of film deformation of the test piece electroconductive film was 19 µm.

Comparative Example 19

In the above-described step [18-5. Step of Producing Electroconductive Film], a part of the resin film in Comparative Example 14 was used. The same operations as those in Example 18 were performed except for the aforementioned matter. The amount of film deformation of the test piece electroconductive film was 22 µm.

[Results]

The results of the aforementioned Examples 20 and 21 and Comparative Examples 18 and 19 are shown in Table 6.

TABLE 6

Film deformation amount of barrier film

|  | Film deformation amount (µm) |
|---|---|
| Ex. 20 | 3 |
| Ex. 21 | 4 |
| Comp. Ex. 18 | 19 |
| Comp. Ex. 19 | 22 |

DISCUSSION

Figure 8:
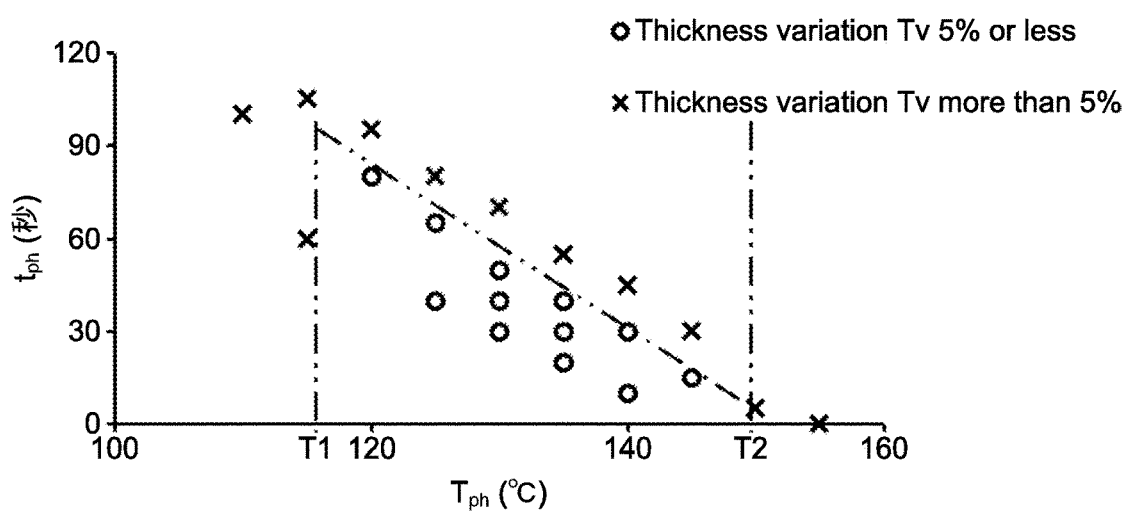
FIG. 8 is a graph obtained by plotting a pre-heating temperature Tph and a pre-heating time $t_{ph}$ shown in Tables 2 and 4.

FIG. 8 is a graph obtained by plotting the pre-heating temperature Tph and the pre-heating time $t_{ph}$ shown in Tables 2 and 4. However, FIG. 8 illustrates the relationships between the pre-heating temperature Tph and the pre-heating time $t_{ph}$ in Examples 1 to 15 and Comparative Examples 1 to 6 and 8 to 12 using the first film having a thickness of 50 µm.

As can be seen from FIG. 8, when the pre-heating temperature Tph fell within the range of T1 to T2, a critical pre-heating time $t_{ph}$ (upper limit of pre-heating time $t_{ph}$ (max)) existed between Example and Comparative Example. Herein, it is found that in FIG. 8, a group of upper limits $t_{ph}$(max) exists near a two-dot chain line drawn between a point where the pre-heating temperature $T_{ph}$ is T1 and a point where the pre-heating temperature Tph is T2. In other words, when a critical pre-heating time $t_{ph}$ existed between Example and Comparative Example, the pre-heating temperature Tph was in the range of T1 to T2. Therefore, it was found that in order to reduce the thickness variation Tv of the resin film to 5% or less according to the present invention, as illustrated in FIG. 8, the pre-heating temperature Tph should be set to fall within the range of T1 to T2 and the pre-heating time $t_{ph}$ should be set to be equal to or less than its upper limit $t_{ph}$ (max).

In all of the aforementioned Examples 1 to 17, the thickness variation Tv was 5% or less, and it was confirmed that in these cases, the number of bending cycles to fracture exceeded 100×1000 cycles, that is, bend resistance was excellent. Further, it was confirmed from Comparative Example 7 that crystallization progressed slowly when the thermal setting temperature $T_{ts}$ was low.

In Comparative Example 7, the crystallization degree reached only 26% in spite of the fact that the thermal setting time $t_{ts}$ was set to 30 seconds as in the case of other Examples. Therefore, the resin film of Comparative Example 7 was not sufficiently excellent in strength and bend resistance. The reason for this is considered to be that the thermal setting temperature $T_1$ was 140° C. which was too low. On the other hand, reduction in the thickness variation Tv was achieved in Comparative Example 7, and that is considered to be because the pre-heating time $t_{ph}$ at 130° C. was sufficiently secured. From this, it is assumed that although a mechanism has not been identified, by pre-heating the first film at a constant temperature for a sufficient period of time in the pre-heating step, it was possible to prevent a reduction in thickness uniformity or to achieve homogenization in the subsequent thermal setting step. Inpairment in thickness uniformity may be caused by, for example, the occurrence of local contraction or local relaxation in the film due to exposure to high temperature.

From Examples 18 to 21, it was confirmed that a good electroconductive film whose amount of film deformation is small can be obtained by using the resin film as a substrate film on which an electroconductive layer is to be formed, and a good electroconductive film whose amount of film deformation is small can be obtained by using the resin film as a substrate film on which an electroconductive layer is to be formed.

REFERENCE SIGN LIST 10 third film
11, 12, 13 and 14 edge of third film
20 fourth film
21, 22, 23 and 24 edge of fourth film
30 third film
31 and 32 edge of third film
40 fourth film
41 and 42 edge of fourth film
50 resin film
51 and 52 edge of resin film
53 surface of resin film
70 barrier film
100 holding device
110 frame
121, 122, 123 and 124 clip
200 resin film production apparatus
300 tenter stretching machine
310 and 320 link device
311 and 321 clip
312a-312d link plate
313a and 313b bearing roller
330 and 340 sprocket
410 and 420 conveyance roll
500 oven
510 oven inlet
520 oven outlet
530 oven partition
540 thermal setting chamber
550 relaxation chamber
700 film forming apparatus
701 roll body of resin film
702 roll body of barrier film
711 guide roll
712 can roll
713 guide roll
721 reaction tube
722 electrode
723 power supply
724 gas inlet
730 vacuum evacuation device
790 vacuum chamber

The invention claimed is:

1. A resin film formed of a resin containing a polymer containing an alicyclic structure and having crystallizability, wherein
    a crystallization degree of the polymer is 30% or more, and
    a thickness variation Tv of the resin film represented by the following formula (1) is 5% or less:

$$Tv\ [\%] = [(T\max - T\min)/T\mathrm{ave}] \times 100 \qquad (1),$$

(in the formula (1),
    Tmax is a maximum value of the thickness of the resin film,
    Tmin is a minimum value of the thickness of the resin film, and
    Tave is an average value of the thickness of the resin film).

2. The resin film according to claim 1, wherein
    the polymer containing an alicyclic structure is a hydrogenated product of a ring-opening polymer of dicyclopentadiene.

3. The resin film according to claim 1, wherein
    an internal haze of the resin film is 3% or less.

4. The resin film according to claim 1, wherein
    the resin film is an optical film.

5. An electroconductive film comprising:
    the resin film according to claim 1, and
    an electroconductive layer disposed on the resin film.

6. A barrier film comprising:
    the resin film according to claim 1, and
    a barrier layer disposed on the resin film.

7. A method for producing the resin film according to claim 1, comprising:
    a pre-heating step of pre-heating a first film formed of a resin containing a polymer containing an alicyclic structure and having crystallizability at a pre-heating temperature Tph falling within a range of a first temperature T1 or higher and a second temperature T2 or lower for a pre-heating time $t_{ph}$ in a state where at least two edges of the first film are held to obtain a second film;

a stretching step of subjecting the second film to a stretching treatment at a stretching temperature Tst falling within a range of the first temperature T1 or higher and the second temperature T2 or lower to obtain a third film; and a thermal setting step of maintaining the third film at a thermal setting temperature Tts that is higher than the stretching temperature Tst and falls within a range of a third temperature T3 or higher and lower than a melting point Tm of the polymer for 5 seconds or more in a state where at least two edges of the third film are held, wherein the first temperature T1 is represented by the following formula (2):

$$T1[° C.]=(5\times Tg+5\times Tpc)/10 \qquad (2)$$

(in the formula (2), Tg is a glass transition temperature of the polymer and Tpc is a crystallization peak temperature of the polymer), the second temperature T2 is represented by the following formula (3):

$$T2[° C.]=(9\times Tpc+1\times Tm)/10 \qquad (3),$$

an upper limit $t_{ph}(\max)$ of the pre-heating time $t_{ph}$ is represented by the following formula (4), $$t_{ph}(\max)\ [\sec]=80\times[(T1-Tph)/(T2-T1)]+90 \qquad (4), \text{ and}$$

the third temperature T3 is represented by the following formula (5):

$$T3[° C.]=(9\times Tpc+1\times Tm)/10 \qquad (5).$$

8. The method for producing the resin film according to claim 7, wherein the thermal setting temperature Tts falls within a range of the third temperature T3 or higher and a fourth temperature T4 or lower, and the fourth temperature T4 is represented by the following formula (6):

$$T4[° C.]=(2\times Tpc+8\times Tm)/10 \qquad (6).$$

9. The method for producing the resin film according to claim 7, wherein the thermal setting time $t_{ts}$ during which the thermal setting step is performed is equal to or less than 90 seconds.

10. A method for producing an electroconductive film comprising a step of forming an electroconductive layer on the resin film according to claim 1.

11. A method for producing a barrier film comprising a step of forming a barrier layer on the resin film according to claim 1.

* * * * *